US005984227A

United States Patent [19]

[11] Patent Number: 5,984,227

[45] Date of Patent: Nov. 16, 1999

Yamaguchi et al.

[54] FILM REWINDING APPARATUS

[75] Inventors: Takuji Yamaguchi; Masasuke Funase, both of Wakayama, Japan

[73] Assignee: Noritsu Koki Co., Ltd., Wakayama, Japan

[21] Appl. No.: 09/252,934

[22] Filed: Feb. 19, 1999

Related U.S. Application Data

[62] Division of application No. 08/806,708, Feb. 27, 1997, Pat. No. 5,909,853, which is a continuation of application No. 08/423,653, Apr. 17, 1995, abandoned.

[30] Foreign Application Priority Data

Apr. 20, 1994 [JP] Japan .................................... 6-81880

[51] Int. Cl.[6] .................................................. G03B 23/02

[52] U.S. Cl. .................................... 242/538.4; 242/348.1; 242/348.4

[58] Field of Search ............................. 242/348.1, 348.4, 242/538.4, 358.1

[56] References Cited

U.S. PATENT DOCUMENTS 4,406,534 9/1983 Viehrig et al. ...................... 354/354 X
5,335,038 8/1994 Blackman et al. ...................... 354/319
5,439,186 8/1995 Merle et al. ......................... 242/348.1
5,465,920 11/1995 Merle et al. ......................... 242/348.1

FOREIGN PATENT DOCUMENTS 6-35123 2/1994 Japan .

*Primary Examiner*—John Q. Nguyen
*Attorney, Agent, or Firm*—Armstrong, Westerman, Hattori, McLeland & Naughton

[57] ABSTRACT

A film-rewinding apparatus to rewind a film from a cartridge into a container which can accommodate the film therein by inserting the film from an opening of the container. The apparatus comprises a cartridge-supporting portion which supports the cartridge; a shielding door driving mechanism for opening and closing the shielding door; a spool-driving mechanism for feeding the film out by driving the spool; a container-supporting portion for supporting the container; an opening and closing driving mechanism for opening and closing the opening; and a film-dismounting mechanism for dismounting the film from the spool. The film-rewinding apparatus can easily perform rewinding by only operating a handle or lever, or by a switching operation, after the cartridge and the intermediate magazine are set and the cover is locked.

4 Claims, 22 Drawing Sheets

FILM REWINDING APPARATUS

This application is a Division of 08/806,708 filed Feb. 27, 1997, U.S. Pat. No. 5,909,853, which is a continuation of 08/423,653, filed Apr. 17, 1995, Abandoned.

BACKGROUND OF THE INVENTION

The present invention relates to a film-rewinding apparatus. More particularly, the present invention relates to an apparatus to rewind a film from a cartridge (patrone) into a container of a developing machine (hereinafter referred to as an "intermediate magazine").

A film housed in a container which cannot be set to a film automatic developing machine (110, 120, 126 sizes and the like) has to be rewound into a container exclusive for a developing machine capable of being set to the machine. Therefore, it has been conventionally conducted to rewind an exposed film from a cartridge into a predetermined intermediate magazine. In the present situation, however, the film is rewound into a separate container manually in a darkroom where both hands can be put into, which is time-consuming and inefficient.

Furthermore, when a film and a leader are connected, it is required to open a shielding door of the cartridge and to pull out the tip of the film from a film port of the cartridge. But since there is provided no shielding material in the film port of the cartridge, light comes into the cartridge, therefore there is a problem that the work cannot be done in a light room.

The present invention has been completed under this circumstance. It is therefore a primary object of the present invention to provide a film-rewinding apparatus which can easily rewind a film from a cartridge into an intermediate magazine of a developing machine.

SUMMARY OF THE INVENTION

In accordance with the present invention, there is provided a film-rewinding apparatus to rewind a film from a cartridge which comprises a spool having a pawl on a shaft portion to rewind the film thereto, an outer case having a film port while supporting the spool rotatably, a shielding door provided on the film port, and a shielding door operating shaft to open/close the shielding door, into an intermediate magazine which can accommodate the film therein by inserting the film from an opening of the intermediate magazine, the apparatus comprising: a cartridge-supporting portion which supports the cartridge; a shielding door driving mechanism for opening/closing the shielding door; a spool-driving mechanism for feeding out the film by driving the spool; an intermediate magazine supporting portion for supporting the intermediate magazine; an opening and closing driving mechanism for opening and closing the opening of the intermediate magazine; and a film-dismounting mechanism for dismounting the film from the spool by inserting a film-dismounting plate in a thin-film form having elasticity between the pawl of the spool and the film.

It is preferable that the intermediate magazine has a shaft to which the film is engageable and a film-rewinding mechanism for driving the shaft, and it is further preferable that the shaft of the intermediate magazine is provided with a guide plate for guiding the film.

Furthermore, it is preferred that the apparatus includes a cartridge holder having a plurality of the cartridge-supporting portions and a moving means for moving a cartridge supported by the cartridge holder from a pass-by position to a set position. The apparatus preferably includes an intermediate magazine holder having a plurality of the intermediate magazine supporting portions and a moving means for moving a intermediate magazine supported by the intermediate magazine holder from a pass-by position to a set position.

In the film-rewinding apparatus of the present invention, there are two types, one is a case type in which the intermediate magazine utilizes a curl which a film has as a habit to insert a film from an opening thereof to accommodate it therein, and the other is a driving type which has a shaft and rewinds a film by driving the shaft.

In the case type, the shielding door of the cartridge supported by the cartridge-supporting portion is opened and the opening of the intermediate magazine is opened, then the spool is rotated by the spool-driving mechanism to feed out the film to the intermediate magazine side. Lastly, the rear end of the film engaged with a pawl of the spool is put out of place by inserting a film-dismounting plate to complete the operation.

In the driving type, the film is fed out by a spool-driving mechanism until the tip of the film reaches the shaft of the intermediate magazine, but after the film is engaged with the shaft, it is wound by a film-rewinding mechanism. When a guide plate is provided, the film is surely engaged with the shaft.

When a cartridge holder and a intermediate magazine holder are provided, rewinding of plural a cartridges can be continuously carried out.

DETAILED DESCRIPTION

The film rewinding device of the present invention will now be described in detail with reference to the accompanied drawings.

Figure 1:
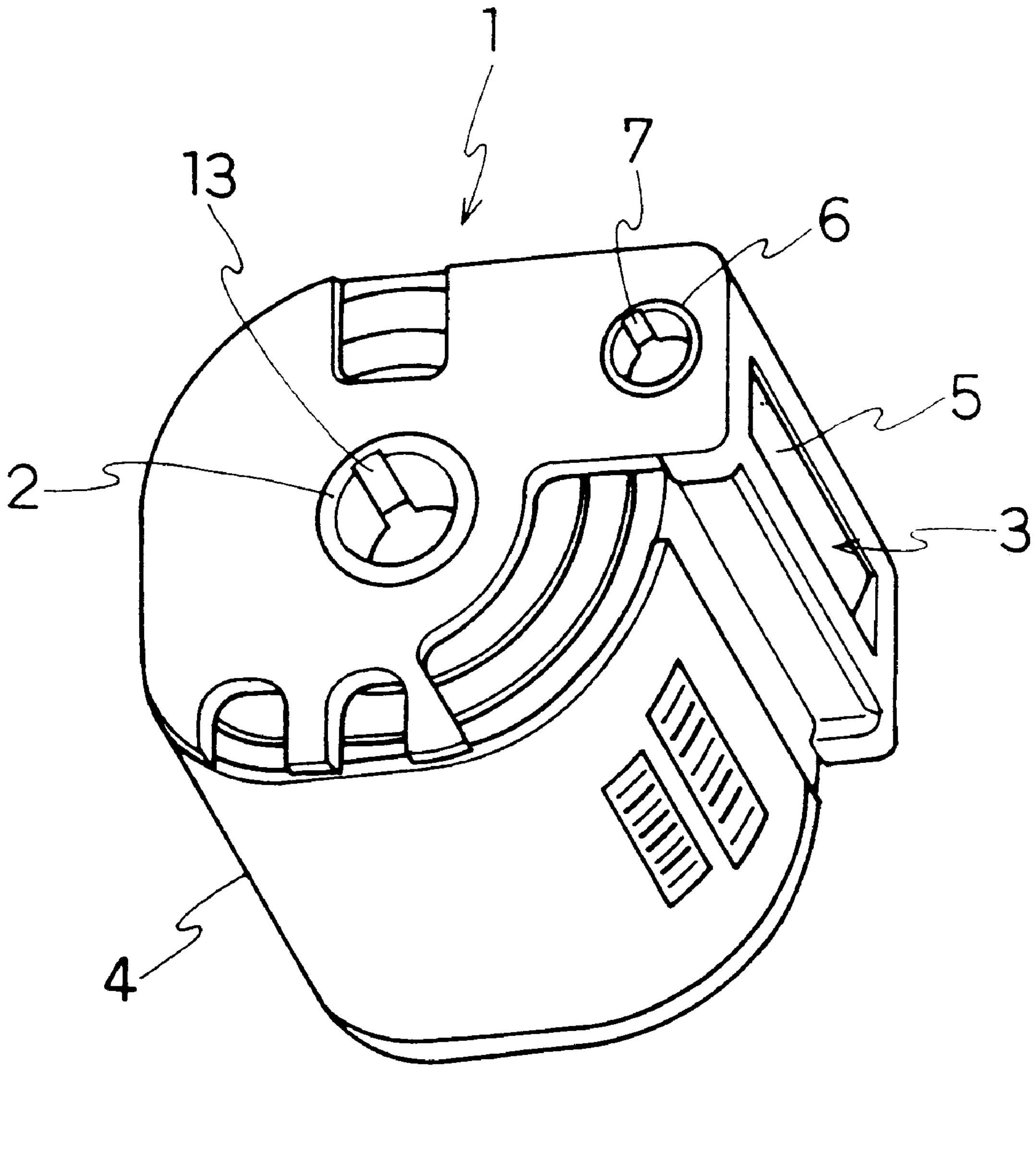
FIG. 1 is a perspective view illustrating a cartridge used in the present invention.

FIG. 1 is a perspective view illustrating a cartridge applied to the film-rewinding apparatus of the present invention. Referring to FIG. 1, a cartridge 1 comprises a spool 2 for winding a film, an outer case 4 which forms a film port 3 through which the film goes in and out while supporting on rotatable spool 2, a shielding door 5 provided on the film port 3 of the outer case 4, and a shielding door operating shaft 6 for opening and closing the shielding door 5. Key grooves 13 and 7 are provided on the outer side surface of the spool 2 and the shielding door operating shaft 6, respectively, and are fitted to a key of a spool-driving axis and a key of a shielding door driving axis described later, respectively.

Figure 2:
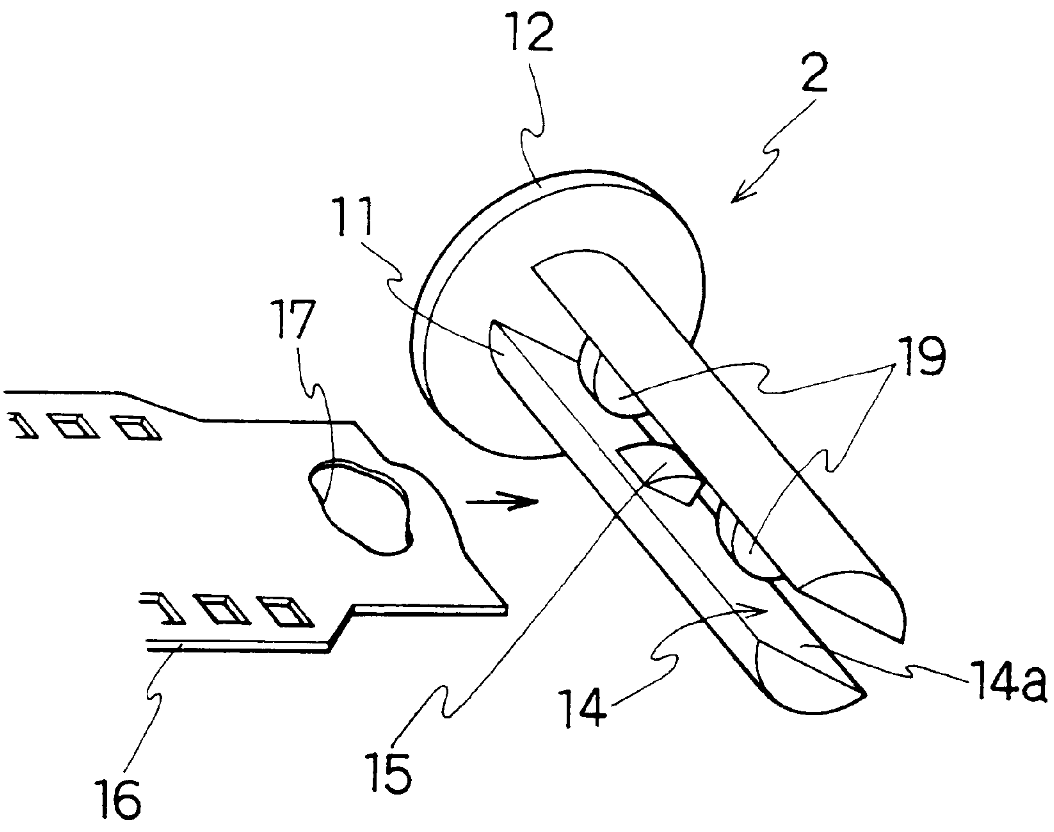
FIG. 2 is a perspective view illustrating one example of a spool of the cartridge of FIG. 1.

As shown in FIG. 2, the spool 2 comprises a shaft portion 11 and flanges 12 on both sides thereof. On the shaft portion 11, a film inserting port 14 is formed, and on the bottom surface 14*a* of the film inserting port 14 is formed a pawl 15. A pawl-stopping hole 17 formed on the rear end of the film 16 is caught by the pawl 15 to mount the film 16 to the spool 2. On the upper surface side of the film inserting port 14, there are provided holding pawls 19 for maintaining the engaging state by holding down the film 16. The surfaces of the pawl 15 and the holding pawls 19 coming into contact with the film 16 are rounded so that the film 16 is not damaged.

Figure 3A:
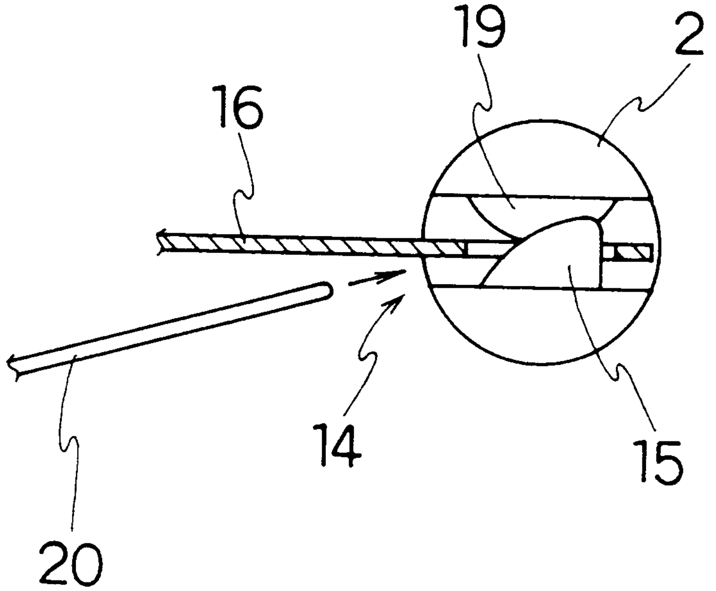
FIGS. 3*a* and 3*b* are sectional views of the spool illustrating the action of a film-dismounting plate in the present invention.
Figure 3B:
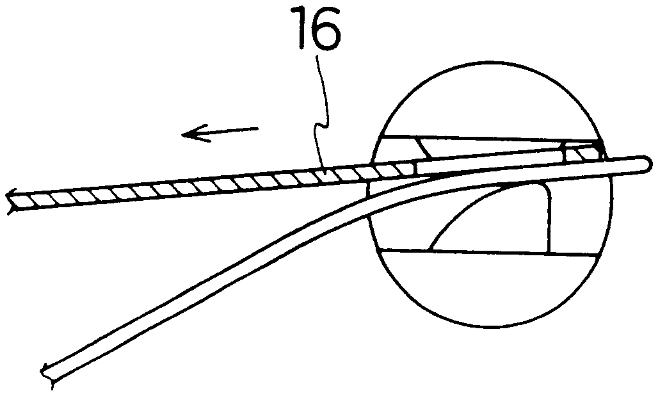
Figure 4A:
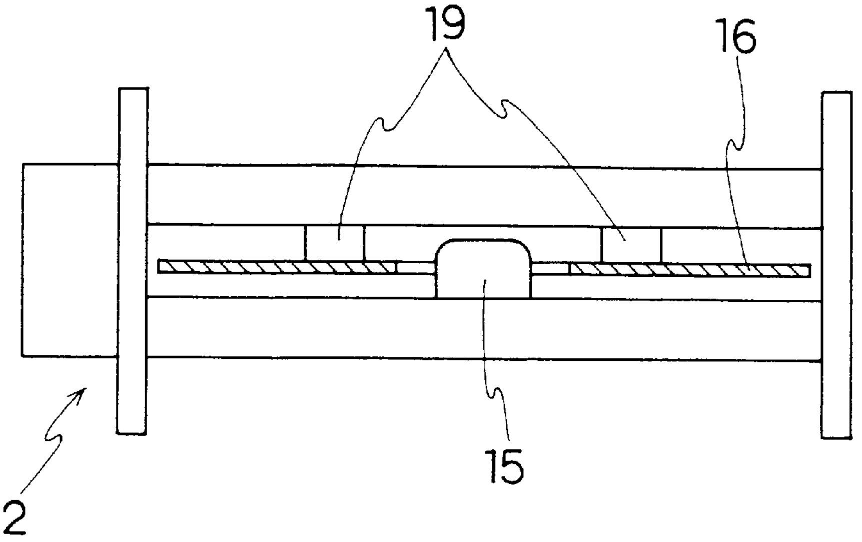
FIGS. 4*a* and 4*b* are side views of the spool illustrating the action of the film-dismounting plate in the present invention.
Figure 4B:
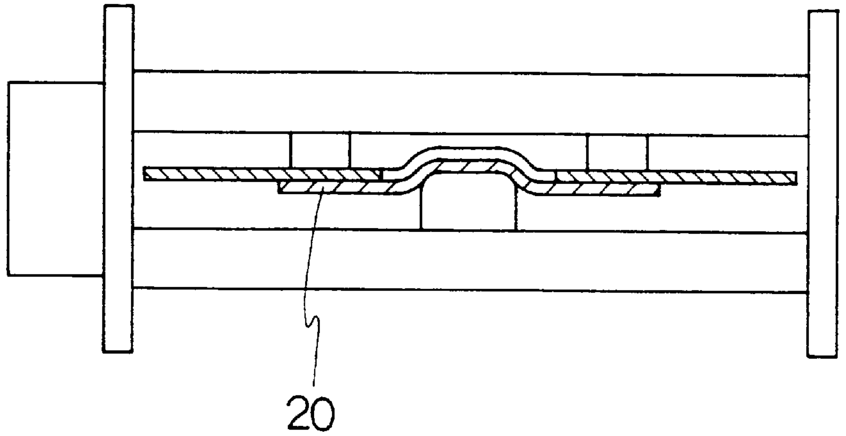

In such cartridge 1, as shown in FIGS. 3*a,* 3*b* and 4*a,* 4*b* the film 16 can be detached from the spool 2 by inserting a film-dismounting plate 20 in a thin-film form having elasticity. FIG. 3*a* and FIG. 4*a* show the engaged states of the film 16, and FIG. 3*b* and FIG. 4*b* show the states wherein the film 16 is being detached from the pawl 15 by inserting the film-dismounting plate 20. The film-dismounting plate 20 is inserted from the lower side of the film toward the film inserting port 14 of the spool 2. Since the film 16 and the film-dismounting plate 20 have elasticity, the plate 20 runs onto the peak of the pawl 15, and at this state (refer to FIG. 3*b*), if the film is pulled, the film can be easily detached from the spool 2.

Figure 5:
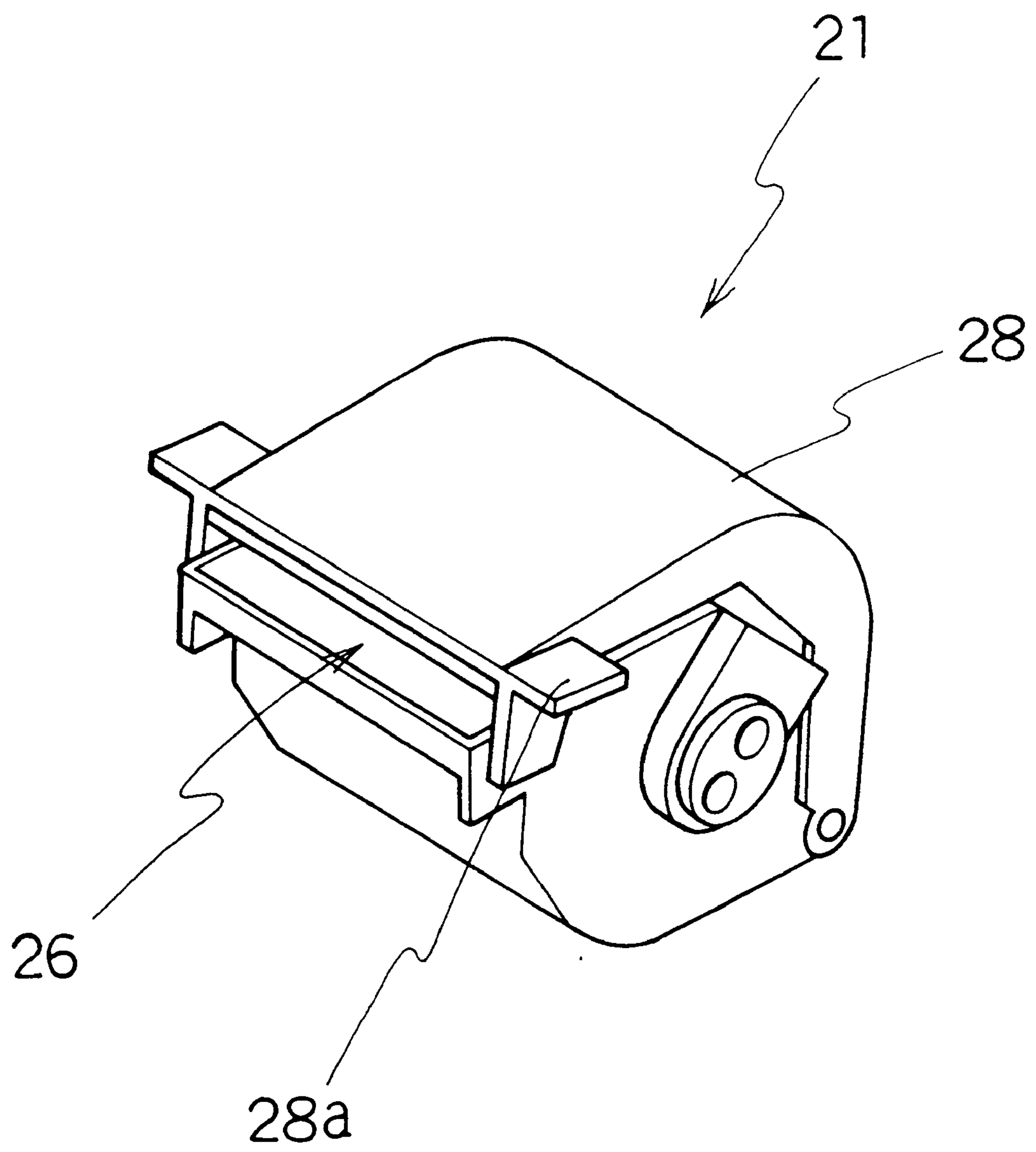
FIG. 5 is a perspective view illustrating an intermediate magazine used in the present invention.
Figure 6:
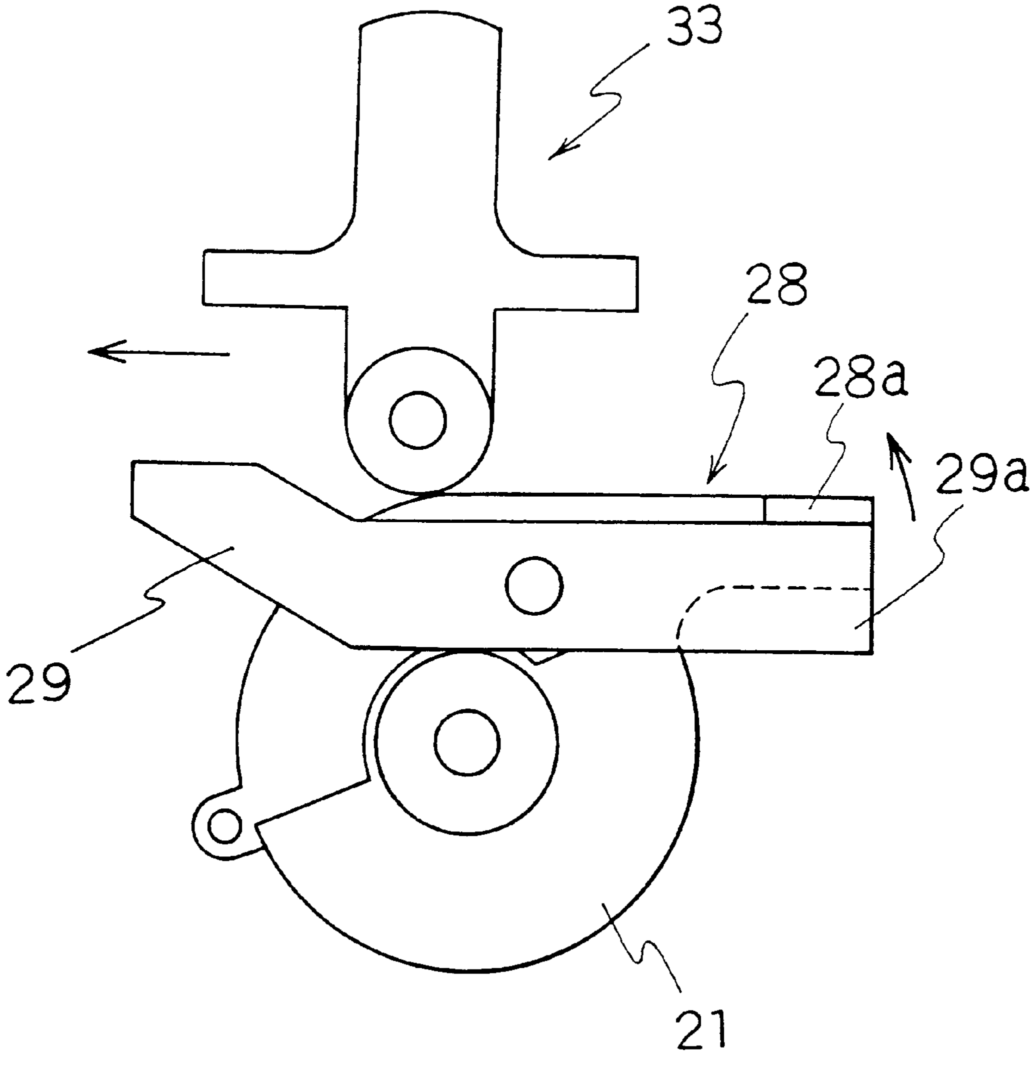
FIG. 6 is an explanatory view showing an opening and closing driving mechanism of the intermediate magazine of FIG. 5.
Figure 12:
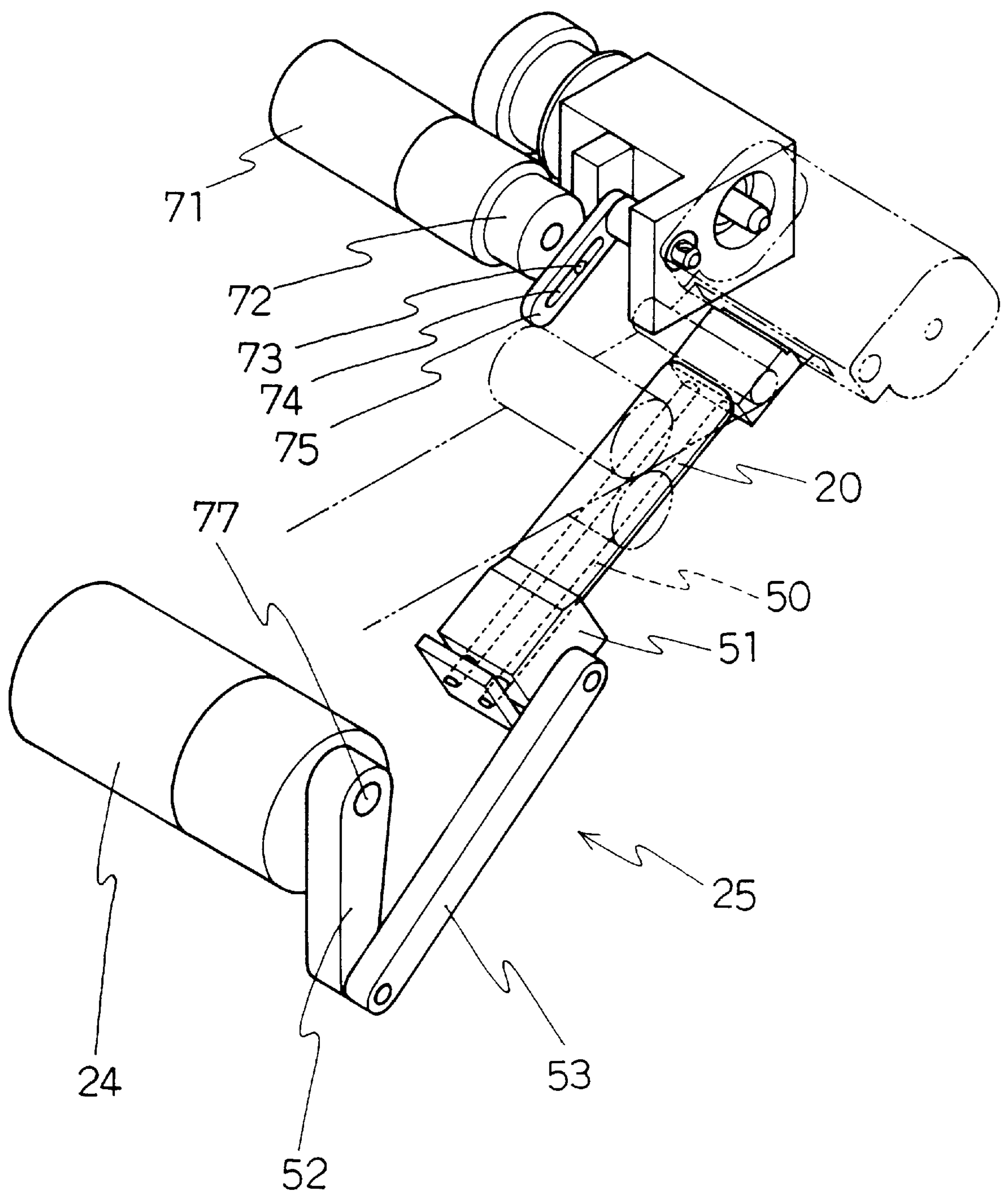
FIG. 12 is a perspective view illustrating one example of a film-dismounting mechanism in the present invention.
Figure 13:
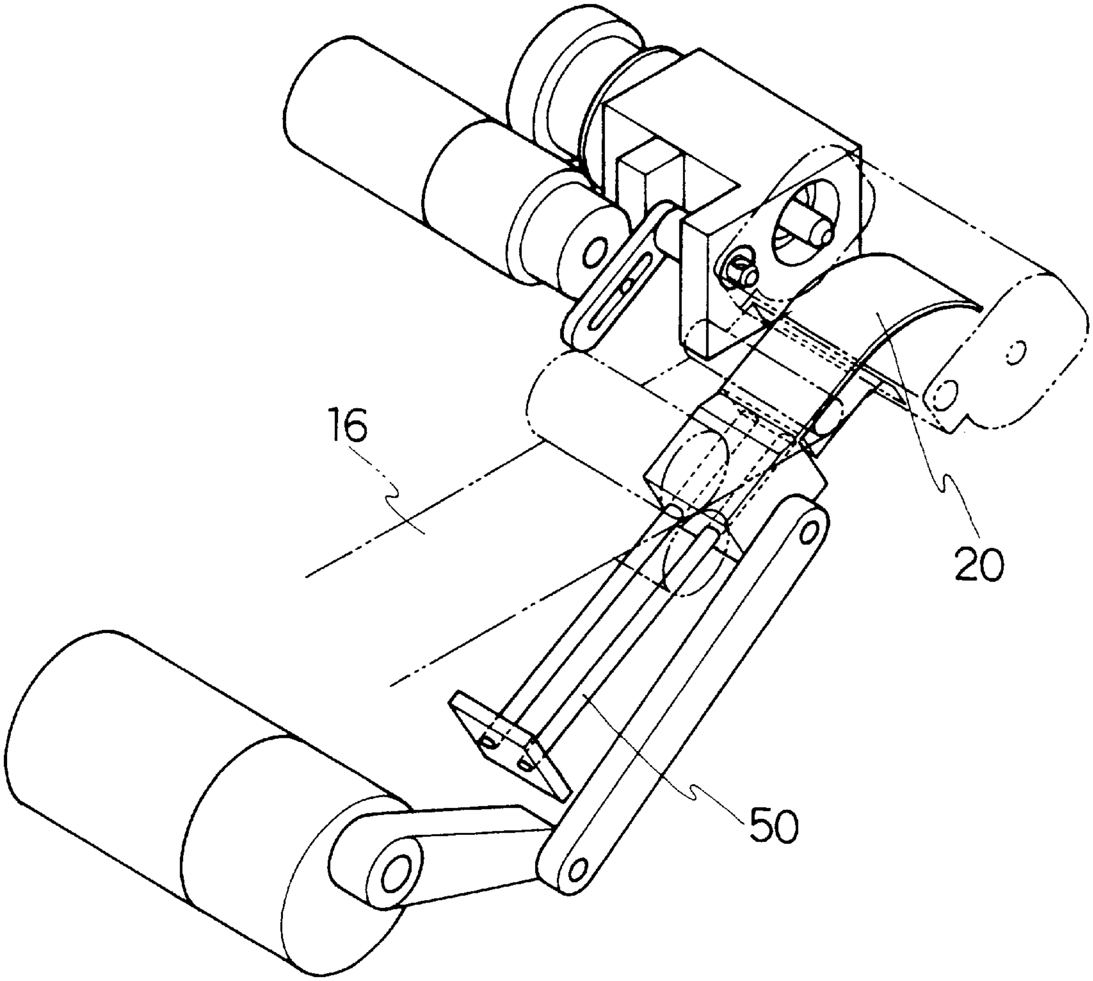
FIG. 13 is a perspective view illustrating the operational state of the film-dismounting mechanism of FIG. 12.

Embodiments of a film-rewinding apparatus of the present invention will now be described with reference to FIGS. 5 to 13. FIGS. 5 and 6 show an intermediate magazine 21 of a pushing type which does not have any of the present invention shown in FIGS. 7 to 13, rewinds a film from a cartridge 1 to the intermediate magazine 21 shown in FIG. 5. A film-rewinding apparatus 22 shown in the appearance perspective view of FIG. 7 and the sectional side view of FIG. 8 is a manual type, and a film-rewinding apparatus 23 shown in the sectional side view of FIG. 10 is an automatic type. In addition, FIGS. 12 and 13 show a film-dismounting mechanism 25 driven by a film-dismounting motor 24. Incidentally, the film-dismounting mechanism 25 shown in FIG. 8 has a film-dismounting lever 35 attached thereto instead of the film-dismounting motor 24 shown in FIG. 12.

Referring to FIG. 5, the intermediate magazine 21 has a structure that an opening 26 is opened/closed by an upper lid 28 having a handle 28*a,* and when the handle 28*a* is pushed upward, the opening 26 is opened. The intermediate magazine 21 has a size enough for accommodating the film 16, when upper lid 28 is moves upward and opening 26 is open and the film 16 is pushed into the intermediate magazine 21 through the opening 26 to be wound into the intermediate magazine 21 naturally because of the curl thereof. Upper lid is then moved downward closing opening 26. As shown in FIG. 6, a arm 29 with a bent end is provided on the portion which supports the intermediate magazine 21 within the film-rewinding apparatus 22 and 23 (an intermediate magazine-supporting portion). By moving a lock lever 33 to the direction of an arrow. The tip 29*a* of the arm pushes the handle 28*a* upward.

Figure 7:
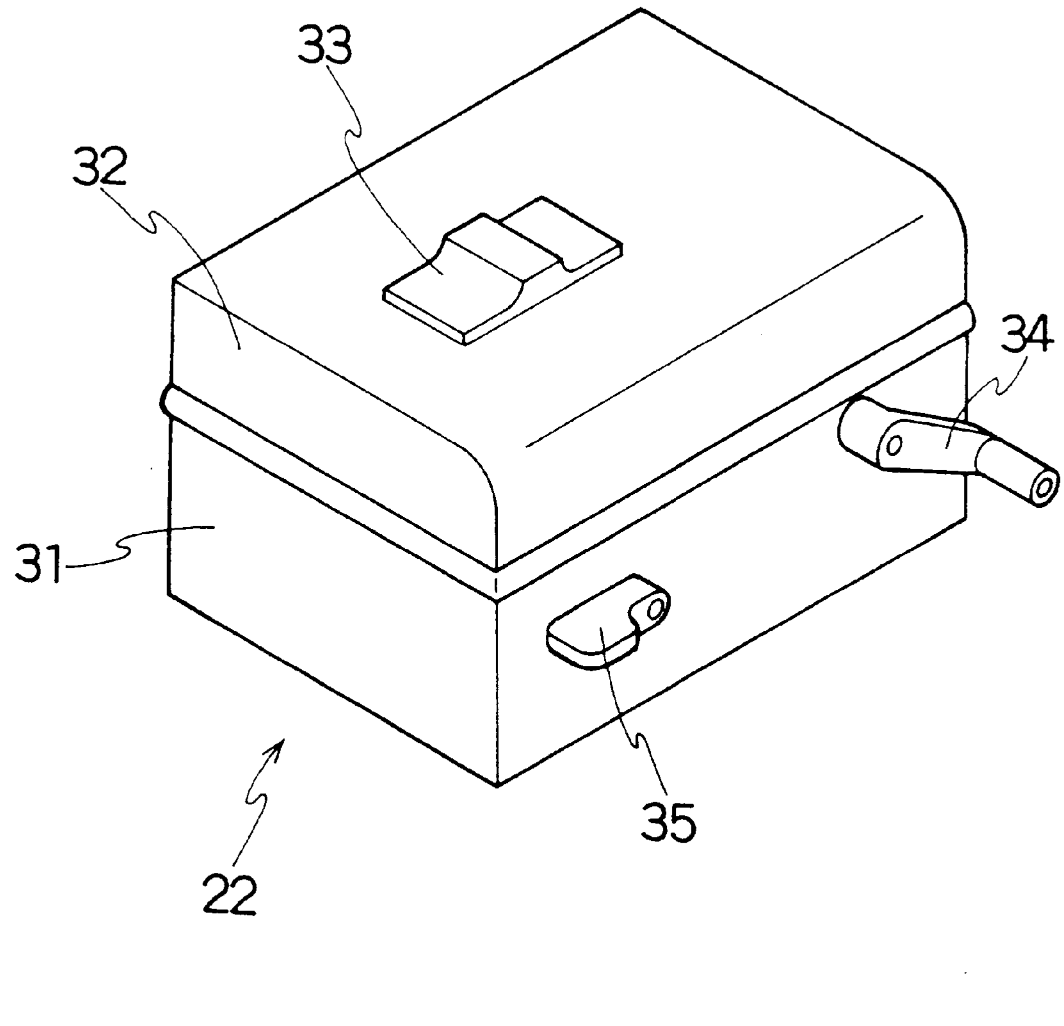
FIG. 7 is an appearance perspective view of an embodiment of a film-rewinding apparatus of the present invention.
Figure 8:
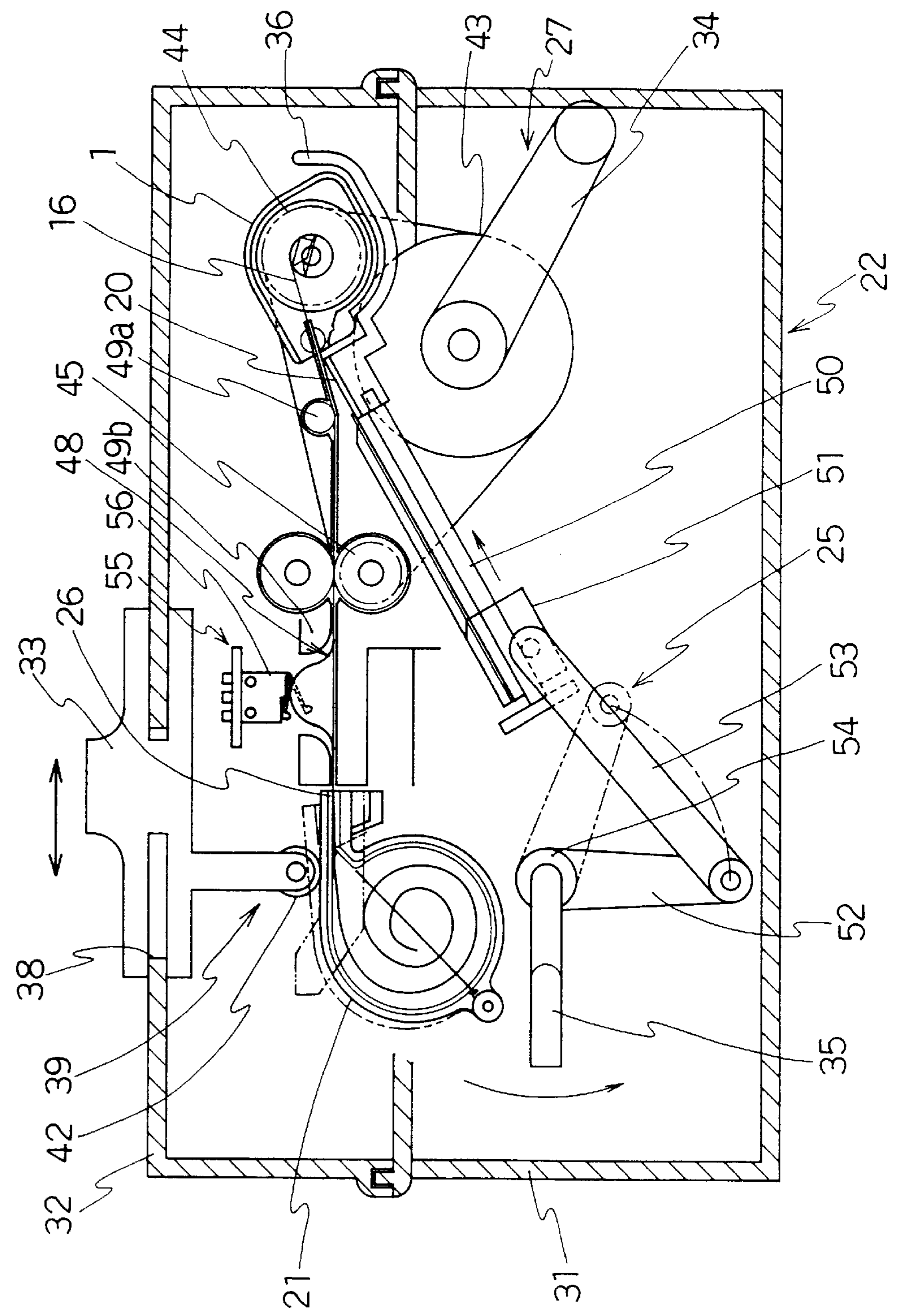
FIG. 8 is a sectional side view illustrating the film rewinding device of FIG. 7.

Referring to FIG. 7, the film-rewinding apparatus 22 of a manual type includes a body 31, a cover 32, a lock lever 33 provided slidably on the cover 32, a handle 34 coupled to the spool 2 of the cartridge I and rotating the spool 2 to push out the film from the cartridge 1 to the intermediate magazine 21, and a film-dismounting lever 35 for advancing the film-dismounting plate 20.

Referring to FIG. 8, in the body 31, there are provided a cartridge-supporting portion 36 and an intermediate magazine supporting portion (not shown) for supporting the cartridge 1 and the intermediate magazine 21, respectively. A lock lever 33 is engaged slidably with a guide groove 38 formed on the cover 32, and a lock mechanism for locking the cover 32 to the body 31 when the lock lever 33 is slided, a shielding door driving mechanism for opening/closing the shielding door 5 of the cartridge 1, and an opening/closing driving mechanism for opening/closing the opening portion 26 of the intermediate magazine 21 are coupled. That is, it is so consituted that when the cover 32 is closed and the lock lever 33 is slided to the closing direction of an arrow (to the left side in FIG. 8), the cover 32 is locked to the body 31, and the shielding door 5 of the cartridge 1 and the opening 26 of the intermediate magazine 21 are opened.

Though not shown, for example, a lock mechanism is composed of a latch having a hole on the body 31 side and a pin on the cover 32 side which is inserted into the hole, and the pin is slided by the lock lever 33 to lock it. Furthermore, the shielding door driving mechanism is so consituted, as shown in FIG. 9, that a lever 41 which rotates a shielding door driving axis 40 fitted into the shielding door operating shaft 6 of the cartridge I is coupled to the lock lever 33.

The opening and closing driving mechanism 39 for opening/closing the opening 26 of the intermediate magazine 21 is so constituted that a roller 42 is provided on the lower side of the lock lever 33, as shown in FIG. 8. That is, when the roller 42 is moved in the left direction, the handle 28*a* of the intermediate magazine 21 is pushed upward to open the opening 26, and when moved in the right direction, the opening 26 is closed. Therefore, when the lock lever 33 is moved in the closing direction of the arrow, the cover 32 is locked, the opening portion 26 of the intermediate magazine 21 and the shielding door 5 of the cartridge 1 are opened, and the film 16 can be fed out by rotating the handle 34. On the contrary, when the lock lever 33 is moved in the opening direction of the arrow, the lock of the cover 32 is released, the shielding door 5 and the opening portion 26 are closed, and the insides of the cartridge 1 and the intermediate magazine 21 are shielded, thus the cover 32 might be opened.

Figure 9:
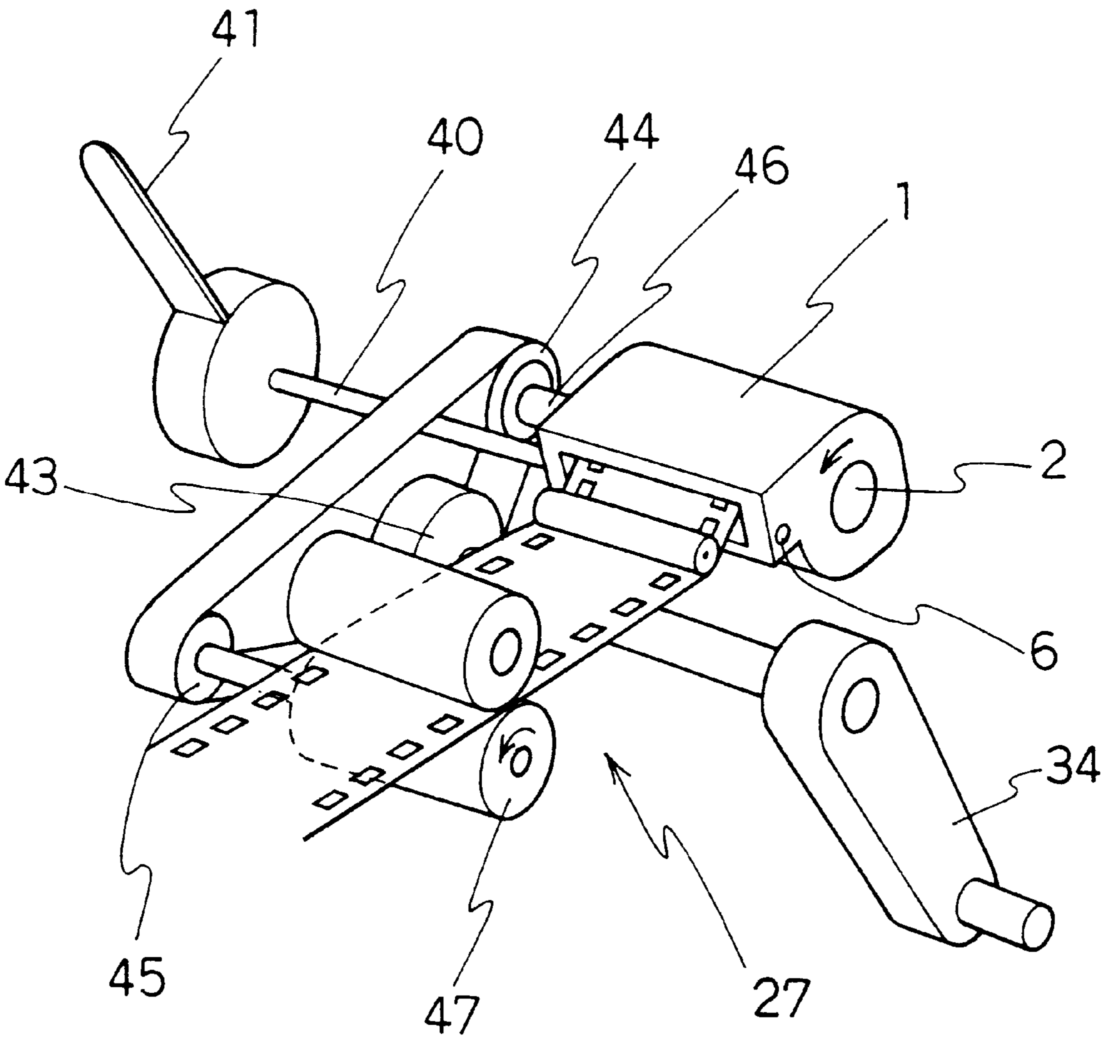
FIG. 9 is a perspective view illustrating the spool driving mechanism of FIG. 7.
Figure 10:
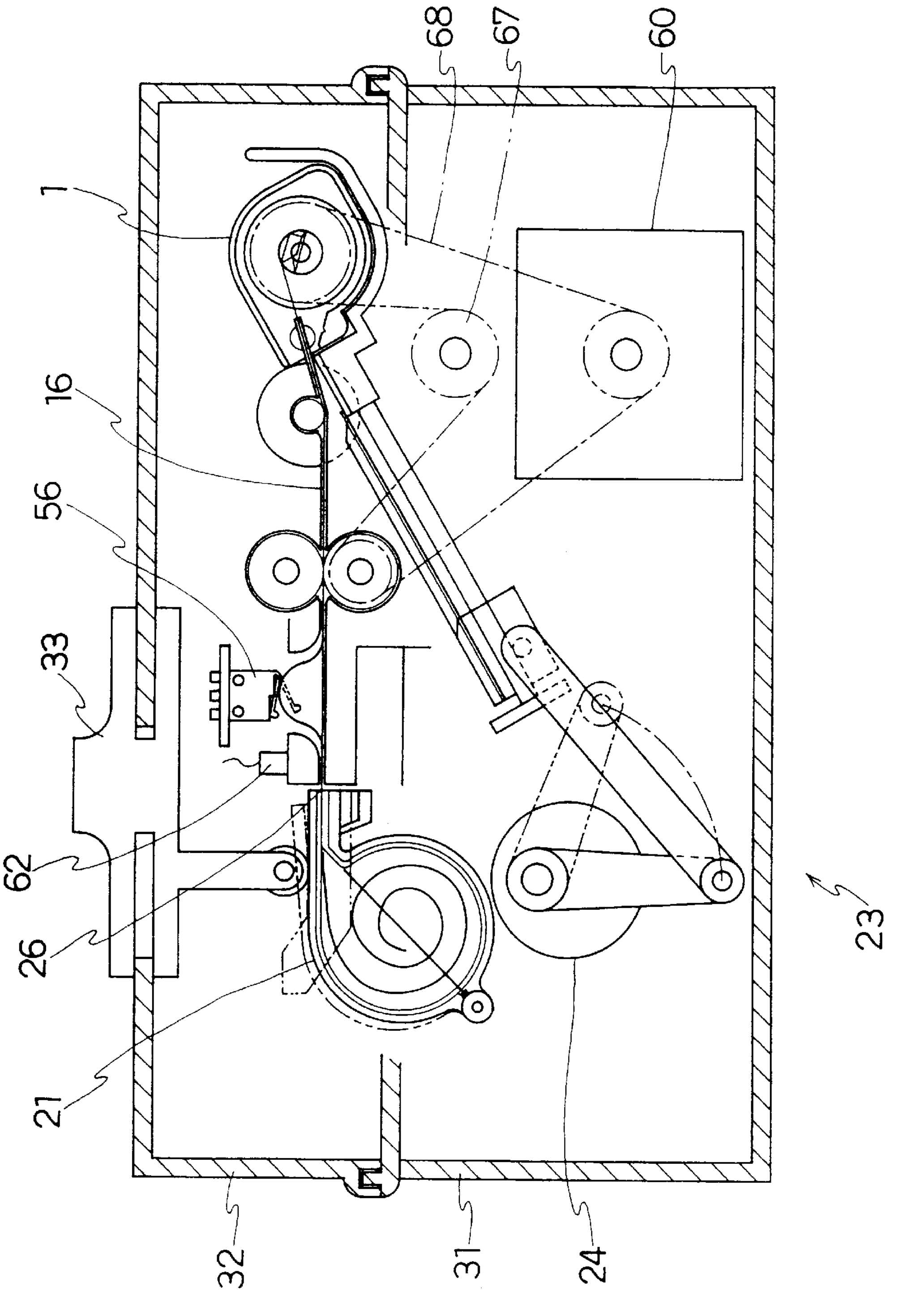
FIG. 10 is a sectional side view illustrating another embodiment of a film-rewinding apparatus of the present invention.

Referring to FIG. 9, the spool-driving mechanism 27 which rotates the spool 2 to feed out the film from the cartridge 1 to the intermediate magazine 21 comprises a handle 34, a driving pulley 43 coupled to the handle 34, the second pulley 44 and the third pulley 45, a spool-driving axis 46 coupled to the second pulley 44 and fitted into the spool 2, and a transfer roller 47 coupled to the third pulley 45. Furthermore, an one-way clutch is provided between the spool-driving axis 46 and the second pulley 44, which absorbs the difference in the film discharge speed from the cartridge 1 and the film transfer speed of the roller 47. Therefore, when the handle 34 is rotated, both the spool 2 and the transfer roller 47 are rotated to feed out the film 16 from the cartridge 1 to the intermediate magazine 21 side. In addition, a guide roller 49*a* and a guide plate 49*b* are provided so that the film is transferred along the transfer channel 48 from the transfer roller 47 to the intermediate magazine 21.

Referring to FIG. 8, the film-dismounting mechanism 25 advances the film-dismounting plate 20 by pushing down the film-dismounting lever 35 to dismount the film 16 from the spool 2 (refer to FIGS. 3 and 4). The film-dismounting plate 20 is supported by a jig 51 slidable on the guide rail 50, and the jig 51 is coupled to the shaft 54 via the first arm 52 and the second arm 53. To the shaft 54, the film-dismounting lever 35 is coupled, and by pushing down this lever 35 in the direction of an arrow, the first arm 52 moves to the position shown by a two-dot chain line, to advance the jig 51 to the direction of an arrow via the second arm 53, and to insert the film-dismounting plate 20 into the cartridge 1. The spool 2 is pulled by a film 16 to direct the film inserting port 14 toward a suitable position (refer to FIG. 3*b*), and when the film-dismounting plate 20 is inserted into the cartridge 1 from the lower side of the film 16, the film 16 can be easily released from the engaged state. From this state, the operator turns the handle 34 little by little while returning the film-dismounting lever 35 to the original position, operates the lock lever 33 to open the cover 32, and picks out the cartridge 1 and the intermediate magazine 21.

Furthermore, the film-rewinding apparatus 22 is provided with a jam-detecting mechanism 55 for detecting the film jam. The jam-detecting mechanism 55 shown in FIG. 8 can give a warning with a buzzer sound by providing a limit switch 56 which is switched by a swell of the film 16 on the transfer channel 48, as shown in FIG. 8, which is caused when, for example, the film 16 cannot be pushed into due to a resistance within the intermediate magazine 21 and the like.

Next, the operation and action procedure of the film-rewinding apparatus 22 shown in FIGS. 7 to 9 will be described. The operator opens the cover 32, sets the cartridge 1 in which a film to be developed is accommodated and the empty intermediate magazine 21, closes the cover 32, and operates the lock lever 33 to lock the cover 32. Thus the opening 26 of the intermediate magazine 21 and the shielding door 5 of the cartridge 1 open simultaneously. Then, the operator turns the handle 34 to feed out the film 16 to the intermediate magazine 21.

When a film jam is caused, the jam-detecting mechanism 55 detects the jam to sound the buzzer. Then, the operator stops to turn the handle 34, covers the film-rewinding apparatus with a darkening bag, and can take a necessary procedure to clear the jammed portion by hand. When the rewinding of the film 16 is completed, the handle 34 cannot be turned any more. Therefore, pressing the film-dismounting lever 35 to insert the film-dismounting plate 20 into the cartridge 1, the operator dismounts the film 16 from the spool 2, and return the film-dismounting lever 35 to the original position. Lastly, the lock lever 33 is slided to release the lock of the cover 32. At the same time, since the opening 26 of the intermediate magazine 21 and the shielding door 5 of the cartridge 1 are closed, the cover 32 is opened and the empty cartridge 1 and the intermedaite magazine 21 having the film 16 therein are picked out. Afterwards, the intermediate magazine 21 is set to the developing machine to carry out the development of the film.

The film-rewinding apparatus 23 which can perform the feeding out and picking out of the film automatically will now be described in detail with reference to FIGS. 10 to 13. The different points from the film-rewinding apparatus 22 shown in FIGS. 7 and 8 are that a spool-driving motor 60 for feeding out the film 16 and a film-dismounting motor 24 are provided instead of the handle 34 and the film-dismounting lever 35, and that a perforation-detecting sensor 62 for controlling the spool-driving motor 60 is provided by utilizing the fact that when the rear end of the film 16 comes near, the perforation becomes interrupted. Incidentally, the one having the same structure with that of the film-rewinding apparatus 22 shown in FIGS. 7 and 8 is referred to with the same reference number.

Figure 11:
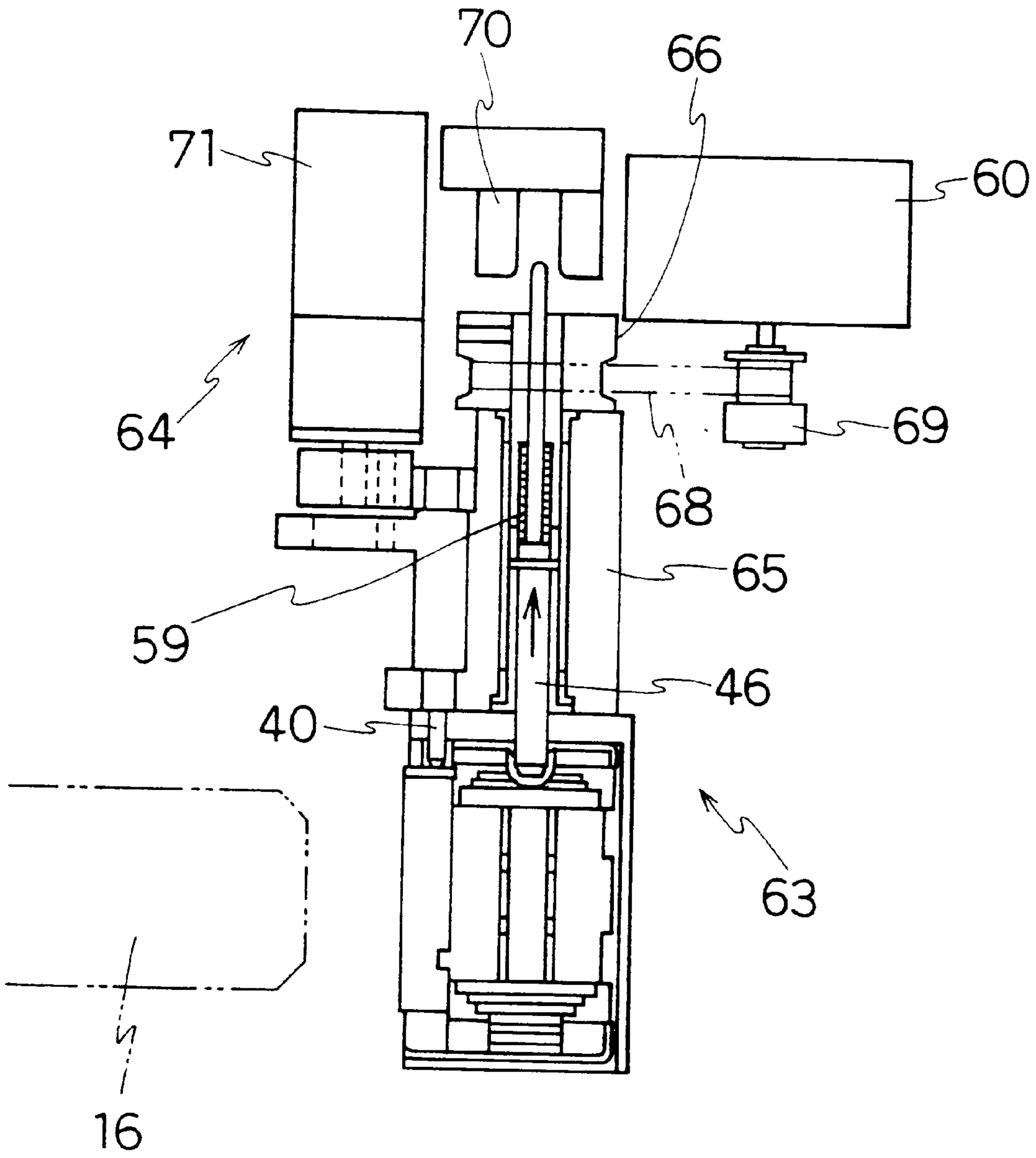
FIG. 11 is an explanatory plan view illustrating the film-rewinding apparatus of FIG. 10.

FIG. 11 is an explanatery a plan view illustrating the film-dismounting device 24 of FIG. 10, and particularly, showing a spool-driving mechanism 63 for feeding out the film 16 and a shielding door driving mechanism 64 which opens and closes the shielding door 5.

The spool-driving axis 46 and the shielding door driving axis 40 are supported rotatably by a unit frame 65, and when the cartridge 1 is mounted, the shielding door driving axis 40 is fitted to the key groove 7 without fail, but the spool-driving axis 46 is not fitted unless the key groove 13 is matched, and is drawn back in the direction of an arrow against the force of the coil spring 59 (refer to FIG. 11). But when the spool-driving axis 46 is rotated, it is fitted to the key groove 13 to rotate the spool 2. To the periphery of the rear end of the spool-driving axis 46 is attached a pulley 66 which is coupled to a driving pulley 69 via a relay pulley 67 by a belt 68. The driving pulley 69 is driven by a spool-driving motor 60. Furthermore, a photosensor 70 is provided so as to surround the rear end of the spool-driving axis 46 to detect that the spool-driving axis 46 is fitted into the key groove 13 of the spool 2.

The shielding door driving axis 40 is, as shown in FIG. 12, coupled to a disk 72 which is rotated by a shielding door driving motor 71, a pin 73 provided on the outer periphery of the disk 72, and an arm 75 having a pin groove 74 to which the pin 73 is inserted. The shielding door driving motor 71 rotates in one direction (does not turn over), and the arm 75 repeats rocking at an angle required for opening and closing the shielding door 5 (about 90 degrees). Therefore, when the shielding door driving axis 71 is half rotated, the shielding door driving axis 40 rotates about 90 degrees to open the shielding door 5.

The film-dismounting mechanism 25 shown in FIG. 12 includes a film-dismounting motor 24 mounted thereto instead of the film-dismounting lever 35 shown in FIGS. 7 and 8. This film-dismounting mechanism 25 comprises a film-dismounting plate 20, a jig 51 which supports the film-dismounting plate 20, a guide rail 50 which slidably supports the jig 51, a second arm 53 with one end coupled to the jig 51, a first arm 52 with one end coupled to the other end of the second arm 53, and a film-dismounting motor 24. The other end of the first arm 52 is coupled to the driving axis 77 of the motor. Therefore, when the film-dismounting motor 24 rotates one round, the film-dismounting plate 20 advances and retreats. FIG. 13 shows a state wherein the film-dismounting plate 20 advances. The film-dismounting plate 20 is of a thin-film form having elasticity, and enters between the film 16 and the pawl of the spool 2 to detach the film 16 from the pawl 15.

Next, the operation and action procedure of the film-rewinding apparatus 23 will be described with reference to FIG. 10. The operator first opens the cover 32, and sets the cartridge 1 in which a film to be developed is accommodated the empty intermediate magazine 21. Then, the operator closes the cover 32, lets the lock lever 33 slide to lock the cover 32 to the body 31, and at the same time, opens the opening portion 26 of the intermediate magazine 21. Then, by working together with the lock lever 33, or by operating the switch, the control of each motor is started to automatically rewind the film 16 into the intermediate magazine 21. Namely, a switch of the spool-driving motor 60 is turned OIL The spool- driving motor 60 rotates slowly at first, to fit the key of the spool-driving axis 46 to the key groove 13 of the spool 2. When the key is fitted into the key groove 13, the spool-driving axis 46 advances a little, which is detected by the photosensor 70, then the switch of the shielding door driving motor 71 is turned on. After the shielding door 5 of the cartridge 1 is opened, the spool-driving motor 60 is driven in full scale to feed out the film 16 to the intermediate magazine 21. Any film jam is detected by a limit switch 56 to automatically turn off the switch of the spool-driving motor 60. The limit switch 56 is also coupled to the warning device such as a buzzer, thus informs the film jam to the operator. In such a case, the operator covers the film-rewinding apparatus with a darkening bag, and opens the cover 32 to manually dispose of the film jam. When the film has been rewound, the perforation-detecting sensor 62 detects the rear end hole of the film to stop the spool-driving motor 60. Then, the spool-driving motor 60 is rotated in a certain amount when the film-dismounting motor 24 is half rotated to allow the film-dismounting plate 20 to be inserted into the cartridge 1, to dismount the film 16 from the spool 2, as well as to feed out the rear end of the film 16 to the proper position. At the same time, the film-dismounting motor 24 is reversed to retreat the film-dismounting plate 20. The operator is informed of the completion of the work by an completion lamp or the like. The operator then slides the lock lever 33 to release the lock of the cover 32, and after closing the opening 26 of the intermediate magazine 21, opens the cover 32, picks out the cartridge 1 and the intermediate magazine 21, and sends the intermediate magazine 21 to the developing machine.

FIGS. 14 to 18 illustrates another embodiment of a film-rewinding apparatus of the present invention. The film-rewinding apparatuses 80 and 120 shown in FIG. 14 and FIG. 18 include the intermediate magazines 81, FIG. 14, and 121, FIG. 18, to be set having shafts 85 and 125, respectively, and the film is wound to these shafts 85 and 125. Therefore, in order to guide the film to these shafts 85 and 125, guide plates 82 and 122 are respectively provided. Since these shafts 85 and 125 are driven by the film-winding motor 86, they can wind the film. Therefore, the film jam-detecting mechanism 55 shown in FIG. 6 is not required. Furthermore, since the film can be tightly wound to the shafts 85 and 125, the intermediate magazines 81 and 121 can be made compact. The film-rewinding apparatus 80 shown in FIG. 14 includes a guide plate 82 driven together with the film-dismounting mechanism 83, and the film-rewinding apparatus 120 shown in FIG. 18 includes a guide plate 122 provided in the intermediate magazine 121.

Figure 14:
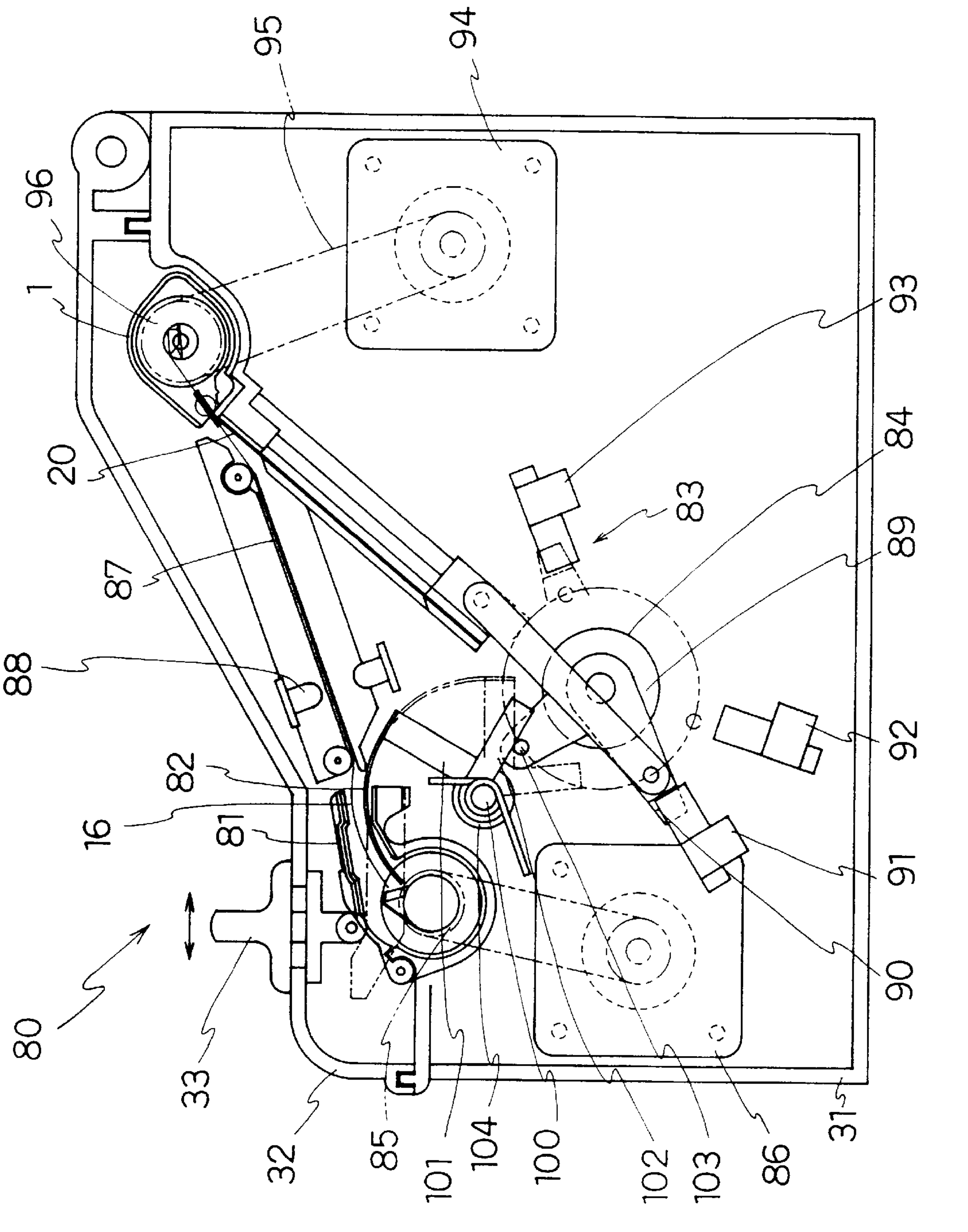
FIG. 14 is a sectional side view illustrating still another embodiment of a film-rewinding apparatus of the present invention.

First, the film-rewinding apparatus 80 will be described with reference to FIGS. 14 to 17. Referring to FIG. 14, the guide plate 82 which guides the film 16 is inserted into the intermediate magazine 81. This guide plate 82 is driven together with the film-dismounting plate 20 by a driving motor 84 coupled to the film-dismounting mechanism 83, and at the time of completion of the operation, it retreats to the position where a sensor 92 detects a detection plate 90. Furthermore, on the midway of the film transfer channel 87, there is provided a perforation-detecting sensor 88 for detecting the position of the film 16, and the detection plate 90 is provided in a V-shaped arm 89 which is rotated by the driving motor 84. In addition, there are respectively provided the first sensor 91, the second sensor 92, and the third sensor 93 which detect the position of this detection plate 90, and they are so constituted that they can control each motor. The spool-driving motor 94 rotates a pulley 96 via a belt 95. The pulley 96 is coupled to the rear end of the spool-driving axis 46, and the spool-driving motor 94 drives till the film 16 is fed out via a transfer channel 87 to the shaft 85 of the intermediate magazine 81. Thereafter, the film 16 is driven by a film-winding motor 86.

The guide plate 82 is a thin plate, the side surface of which exhibits an arc shape, and attached to the tip of an arm 101 which is rotatable around a shaft 100. On the arm 101, there is also provided a lever 102, which is driven by a pin 103 attached to one end of the V-shaped arm 89 driven by the driving motor 84. Furthermore, since the arm 101 is energized in the direction of the two-dot chain line in FIG. 14 by a coil spring 104, when the V-shaped arm 89 is rotated to cause the pin 103 not to push the arm 101 via the lever 102, the guide plate 82 withdraws from the inside of the intermediate magazine 81.

At the other end of the V-shaped arm 89, an arm 105 is rotatably provided. At the other end of the arm 105, there is attached a jig 51 which slides the film-dismounting plate 20 along the guide rail 50.

Figure 16A:
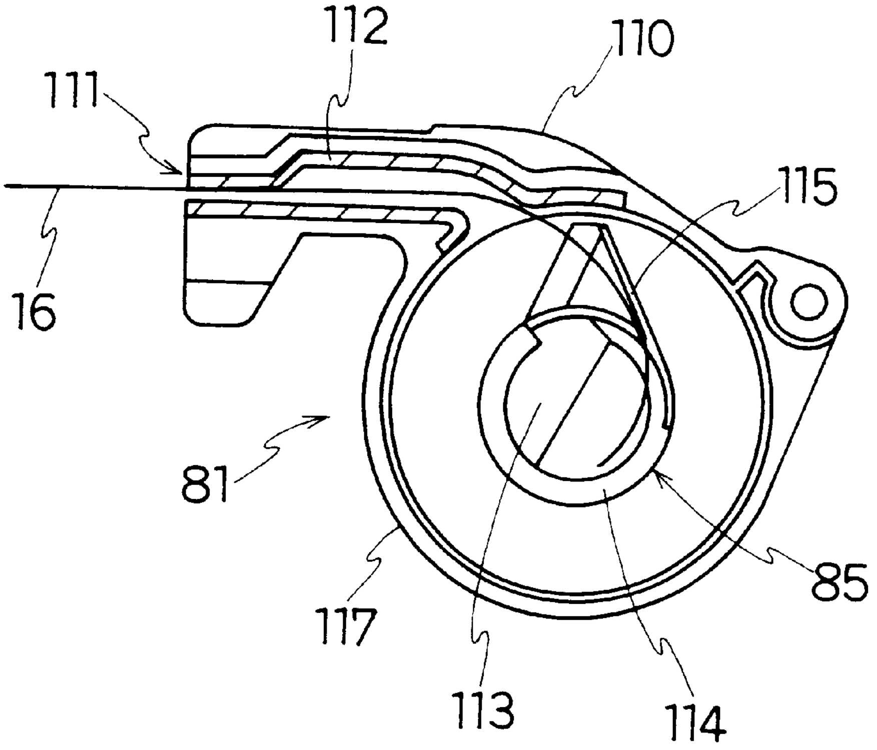
FIGS. 16*a* and 16*b* are sectional side views of an intermediate magazine applied to the film rewinding device of FIG. 14.
Figure 16B:
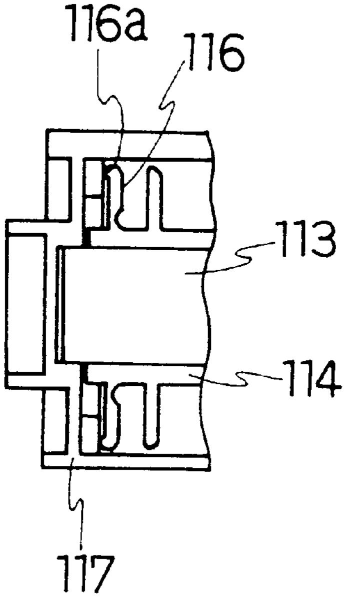

The intermediate magazine 81 has, as shown in FIG. 16, a movable upper cover 110, and by pushing the handle (not shown) upward, like the intermediate magazine 21 shown in FIG. 5, the opening 111 is opened. Numeral 112 represents a shielding material. In addition, the shaft 85 is composed of an inner spool 113, an outer spool 114 and a guide plate 115. On the outer periphery of the frange 116 attached to the end portion of the outer spool 114, there is provided a projection 116*a* which slides the inner surface of the body case 117 to give a rotation resistance (refer to FIG. 16*b*). The guide plate 115 has elasticity so that it winds round the shaft 85 together with the film, being pressed with the film wound by one cycle.

Figure 17A:
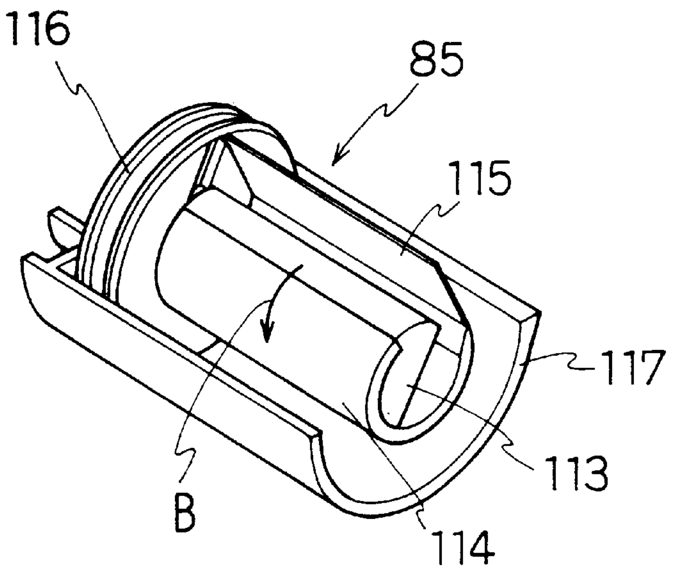
FIGS. 17*a* and 17*b* are sectional perspective views illustrating the shaft of the intermediate magazine of FIG. 16.
Figure 17B:
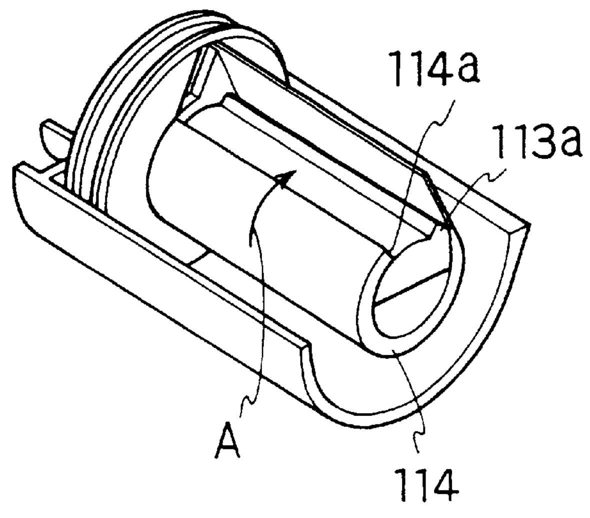

The structure of the shaft 85 will be described with reference to FIG. 17. FIG. 17*a* shows the state of the shaft 85 at the time of inserting the film, and FIG. 17*b* shows the state of the shaft 85 at the time of winding the film.

The inner spool 113 and the outer spool 114 are composed of different members with each other. The inner spool 113 has a section of approximately semicircle, and is provided with a projection 113*a* on the outer peripheral surface so that it can rock against the outer spool 114 in a certain range. The outer spool 114 exhibits a cylindrical shape into which the inner spool 113 is inserted, and has a groove 114*a* on a part of the outer periphery, into which the projection 113*a* of the inner spool 113 is inserted. The guide plate 115 is provided on one edge of the groove 114*a* of the outer spool 114, and leads the film to the inside of the outer spool 114.

The inner spool 113 is fitted into the outside driving axis (not shown), and when it rotates in the direction of the arrow A, it catches therein the end portion of the film inserted into the groove 114*a,* and hooks the outer spool 114 by the projection 113*a* to rotate together. The projection 116*a* (refer to FIG. 16*b*) provided on the flange 116 of the outer spool 114 is to give a resistance so that the outer spool 114 rotates later than the inner spool 113. The inner spool 113 rotates even after the film is caught to wind the film on the outer surface of the outer spool 114. In addition, as shown in FIG. 17*a,* when the inner spool 113 is rotated in the direction of the arrow B, the groove 114*a* is opened to release the end portion of the film Next, the operation and action procedure of the film-rewinding apparatus 80, FIG. 14, will be described. The operator first opens the cover 32, and sets the cartridge 1 in which a film to be developed is accommodated and the empty intermediate magazine 81. Then, the operator closes the cover 32, and lets the lock lever 33 slide to lock the cover 32 to the body 31, and at the same time, to open the opening portion 111 of the intermediate magazine 81. Then, by working together with the lock lever 33, or by operating the switch, each motor starts to automatically rewind the film 16 into the intermediate magazine 81. Namely, a switch of the spool-driving motor 60, FIG. 10, is turned on. The spool-driving motor 60 rotates slowly at first, to fit the key of the spool-driving axis 46, FIG. 11, to the key groove 13 of the spool 2, FIG. 1. When the key is fitted into the key groove, the spool-driving axis 46 advances a little. If this advance is detected by the photosensor, the spool-driving motor 94 is stopped once, and then the switch of the shielding door driving motor 71 is turned on to open the shielding door 5 of the cartridge 1.

Figure 15:
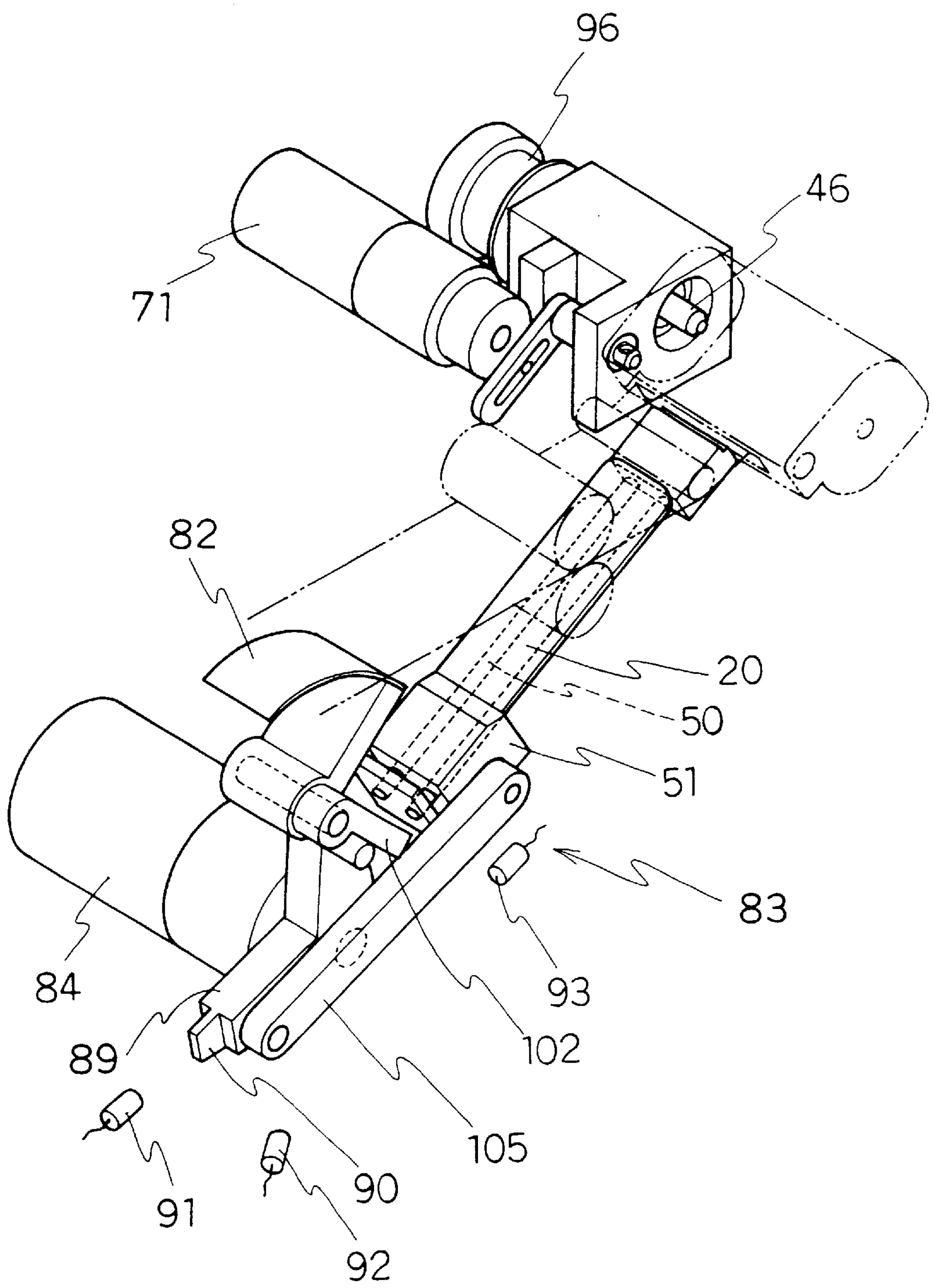
FIG. 15 is a perspective view illustrating another example of a film-dismounting mechanism in the present invention.

Then, the driving motor 84, FIGS. 14 and 15, is rotated, and the rotation thereof is stopped when the first sensor 91 detects the detection plate 90, and the guide plate 82 is inserted into the intermediate magazine 81. Then, the spool-driving motor 94 is driven till it is driven in a predetermined amount after the tip of the film is detected by a perforation-detecting sensor 88 provided in the film transfer channel 87, then it is stopped. At this time, the tip of the film 16 is fed to the shaft 85 of the intermediate magazine 81. The driving motor 84 is driven, and stopped to withdraw the guide plate 82 when the second sensor 92 detects the detection plate 90.

Then, the film-winding motor 86 is rotated to wind the film 16 to the intermediate magazine 81. When the perforation-detecting sensor 88 detects the rear end of the film 16, the film-winding motor 86 is stopped.

Then, the driving motor 84 is rotated till the detection plate 90 comes to the position of the third sensor 93, and when the film-dismounting plate 20 is inserted into the cartridge 1, the film-winding motor 86 is rotated in a predetermined amount to dismount the film 16 from the spool 2, as well as to wind the film 16 till the rear end of the film 16 comes to a proper position. Then, the driving motor 84 is rotated till the detection plate 90 comes to the position of the second sensor 92, to withdraw the film-dismounting plate 20 and the guide plate 82. Afterwards, the completion of the work is indicated to the operator by a sound or a lamp, not shown, and the operator slides the lock lever 33 to release the lock of the cover 32 and to close the opening 111 of the intermediate magazine 81, thereafter, opens the cover 32, picks out the cartridge 1 and the intermediate magazine 81, and sends the intermediate magazine 81 to the developing machine.

Figure 18:
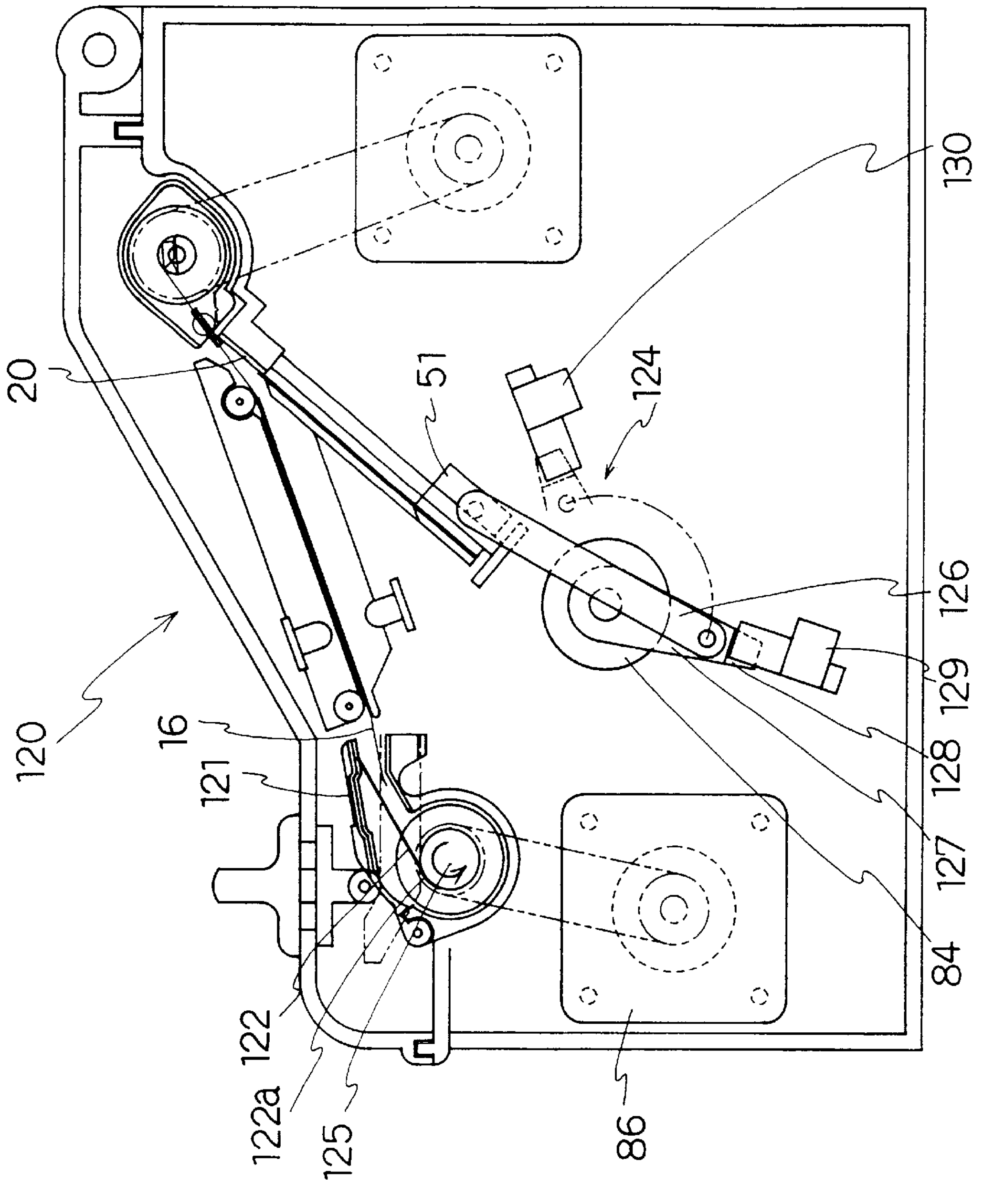
FIG. 18 is a sectional side view illustrating yet another embodiment of a film-rewinding apparatus of the present invention.

Next, the film-rewinding apparatus 120 will be described with reference to FIG. 18. A guide plate 122 is provided in the intermediate magazine 121. This guide plate has elasticity and is coupled to the shaft 125 at a joint portion 122*a*. Then, by inserting the tip of the film 16 from the film port along the inner surface of the guide plate 122, the tip of the film 16 enters straight into the direction of a tangent of the shaft 125, and the film 16 is caught with abutting to the joint portion 122*a* of the shaft 125 and the guide plate 122 without bending inside the intermediate magazine 121. Then, by rotating the shaft 125 in the direction of an arrow, the film 16 is wound together with the guide plate 122 around the outside of the shaft 125.

In the film-rewinding apparatus 120, since it is not necessary to rock the guide plate 82, as in FIG. 14 which is different from the film-rewinding apparatus 80 of FIG. 14, the crank mechanism of the film-dismounting mechanism 124 is simplified. Namely, the second arm 126 and the first arm 127 are simple rod-shape, and make the jig 51 slide by the driving motor 84. At the tip of the first arm 127, a detection plate 128 is attached. By the position of the detection plate 128, the first sensor 129 detects that the film-dismounting plate 20 is withdrawing, and the second sensor 130 detects that the film-dismounting plate 20 is advancing to control the driving motor 84.

Next, still another embodiment of the film-rewinding apparatus of the present invention will be described with reference to FIGS. 19 to 22. This film-rewinding apparatus 150 can support plural cartridges I and plural intermediate magazine 151, and can perform the rewinding operation continuously.

The intermediate magazine 151 used for this apparatus is the type that the film 16 is curled inside to be accommodated when it is inserted from the opening portion 163, and has the similar structure to the intermediate magazine 21 shown in FIG. 5.

Figure 19:
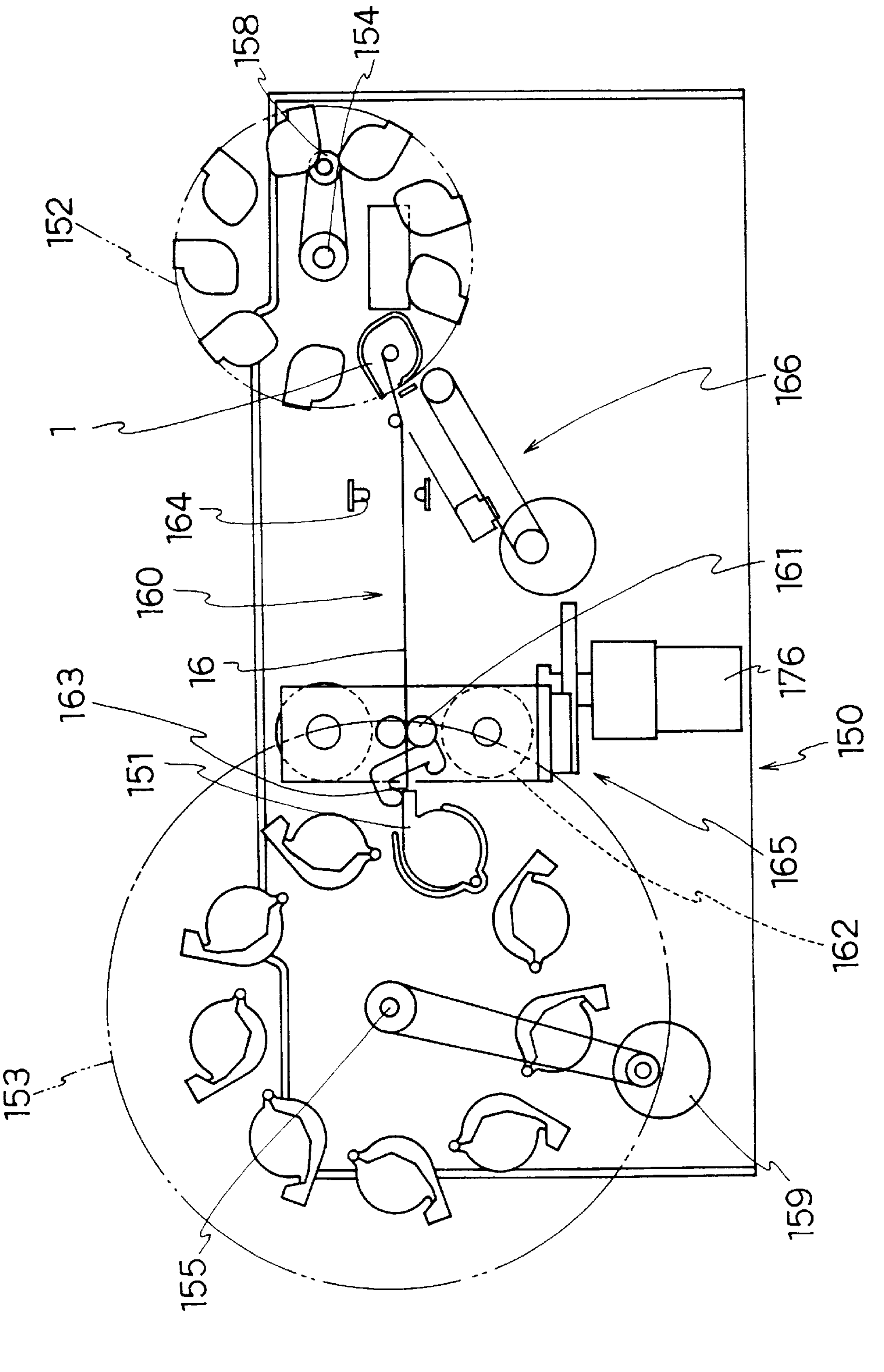
FIG. 19 is a sectional side view illustrating further embodiment of a film-rewinding apparatus of the present invention.
Figure 20:
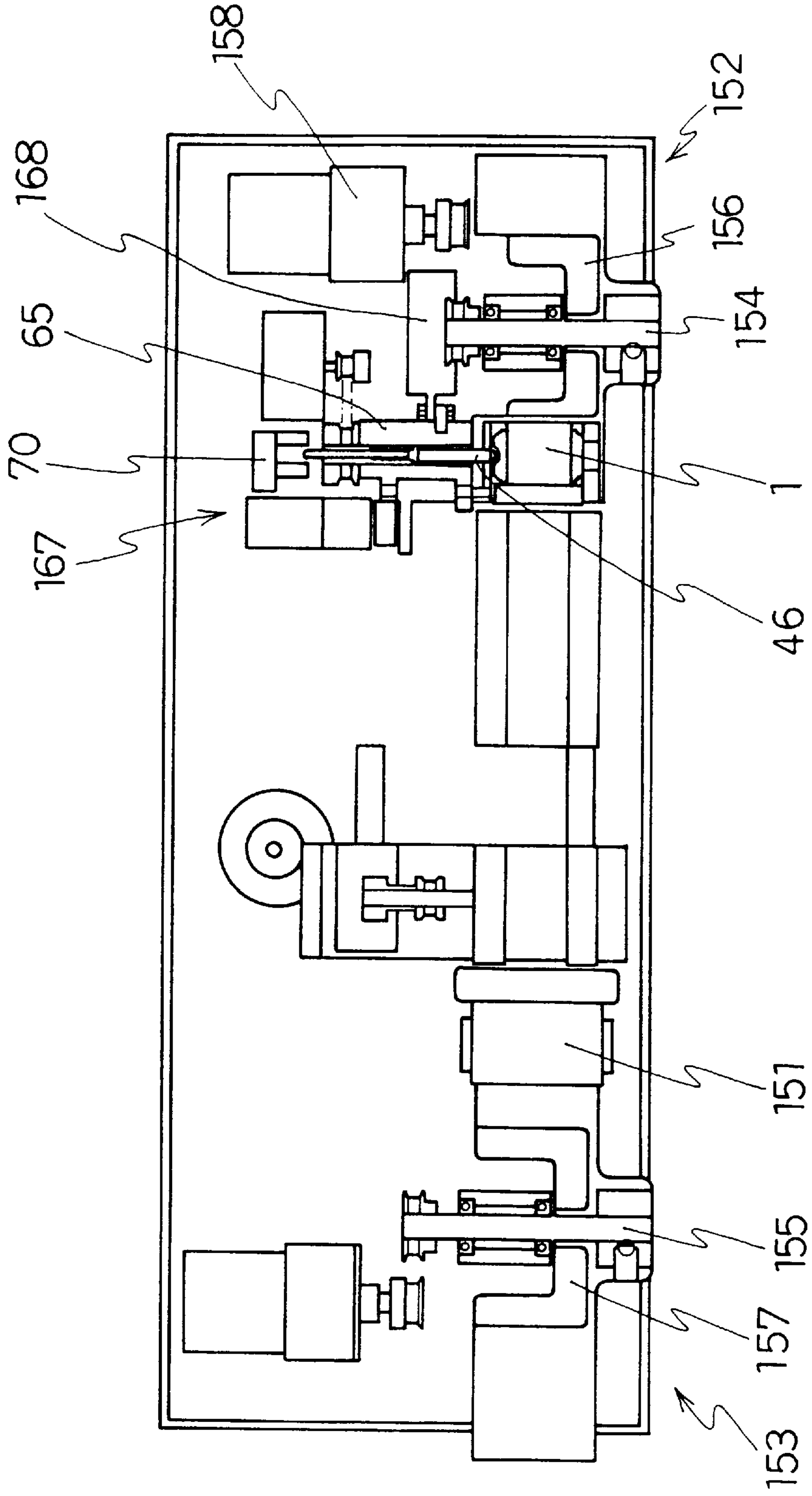
FIG. 20 is an explanatory plan view illustrating the film rewinding device of FIG. 19.

The cartridge holder 152 and the intermediate magazine holder 153 are respectively supported by an arm 158 and 159 provided radially on the shafts 154 and 155, respectively driven by driving motors 158 and 159. The film 16 is fed out from the cartridge 1 set at the predetermined set position to the intermediate magazine 151. In this film transfer channel 160, though not shown, there are properly arranged a transfer roller and a guide plate. The film transfer roller 161 most close to the intermediate magazine 151 is driven by a driving motor 162. Incidentally, in FIG. 19, numeral 165 represents an opening/closing driving mechanism for opening/closing the opening 163 of the intermediate magazine 151, and 166 represents a film-dismounting mechanism Furthermore, in FIG. 20, 167 represents a driving mechanism of a shielding door 5 and a spool 2, and is similar to that shown in FIG. 11. However, in an unit frame 65, there is provided a slide motor 168 to slide the unit frame, and fitting of the spool-driving axis 46 and the shielding door driving axis 40 are conducted automatically.

Figure 21:
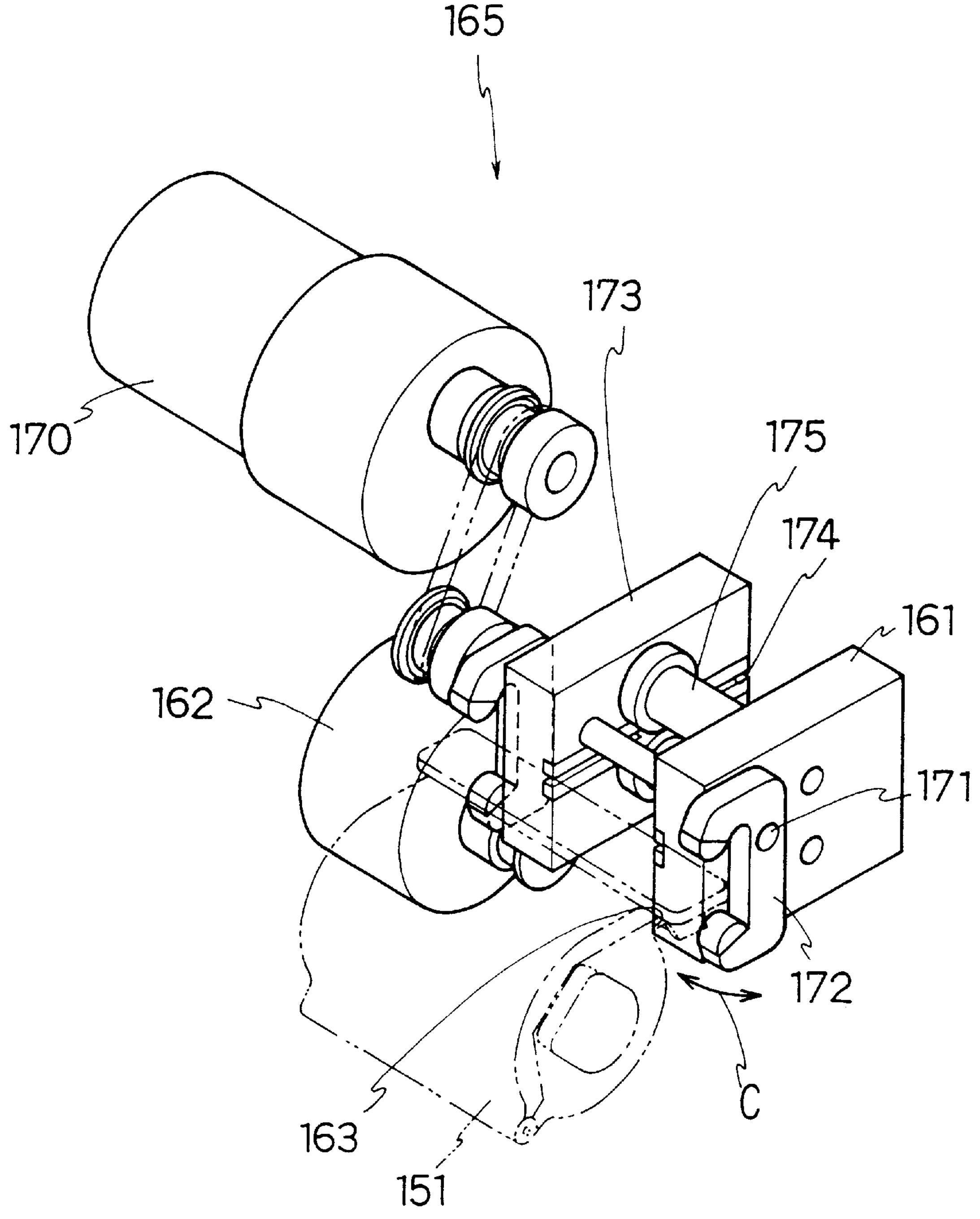
FIG. 21 is a perspective view illustrating the opening/closing driving mechanism of FIG. 19.

The opening/closing mechanism 165 is, as shown in FIG. 21, composed of an opening/closing motor 170, and an opening/closing jig 172 which is rocked around a shaft 171 by the motor in the direction of an arrow C. A slide rack 173 advances and withdraws the opening/closing jig 172 toward the intermediate magazine 151, and driven by a slide motor 176 (refer to FIG. 19). When the intermediate magazine holder 153 is rotated, the slide rack 173 makes the opening/closing jig 172 withdraw to the cartridge side, and when the intermediate magazine 151 is set, the slide rack 173 makes it advance to the intermediate magazine side. Afterwards, driving of the opening/closing driving motor 170 rocks the opening/closing jig 172 in the opening direction of an arrow and opens the opening 163. On the contrary, when closing the opening 163, the opening/closing motor 170 is reversed to rock the opening/closing jig 172 in the closing direction of an arrow to close it. Incidentally, on the inner side of the slide rack 173, a film transfer guide 174 is formed, below which and above which there are provided a film transfer roller 161 and a roller 175, respectively.

Figure 22:
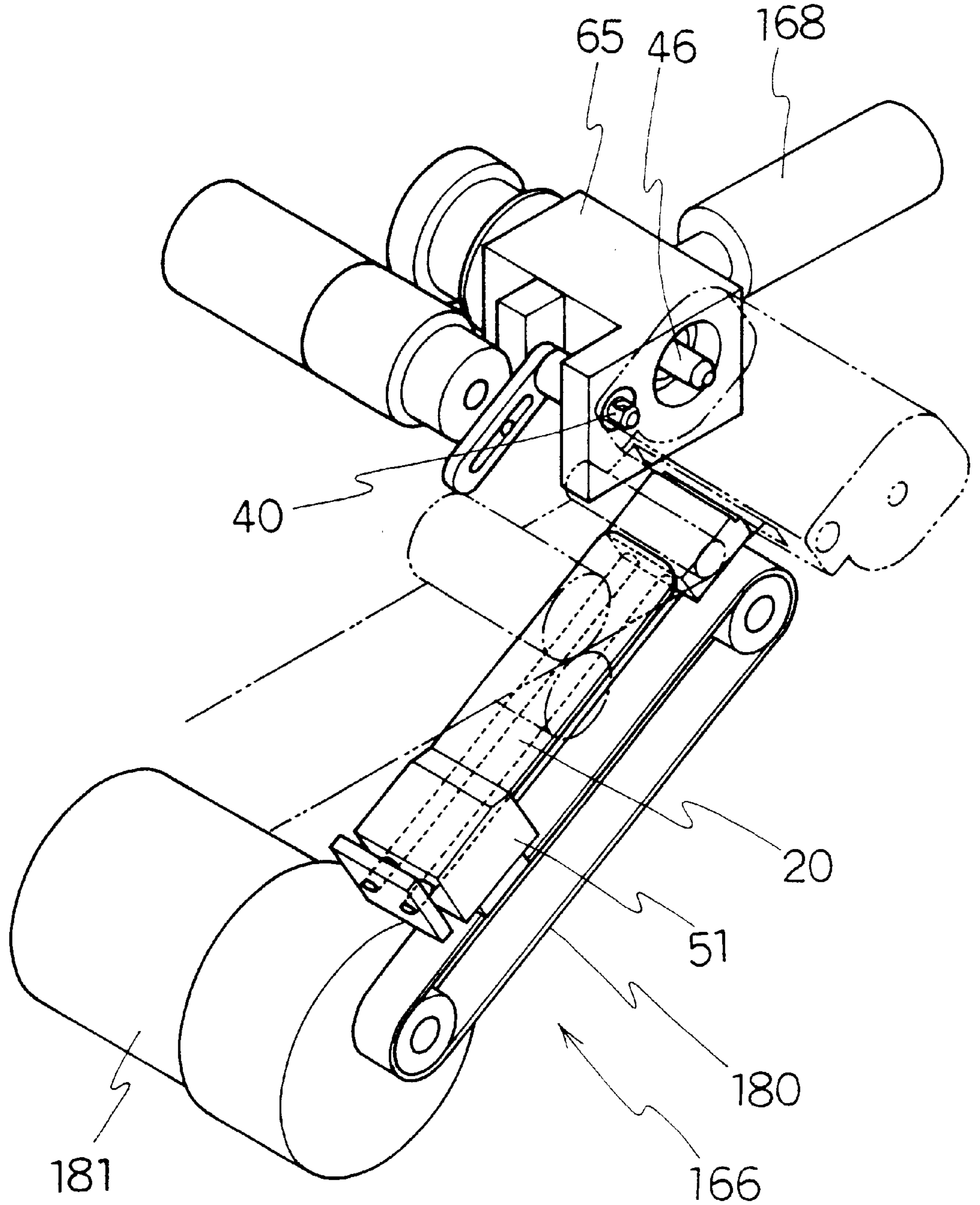
FIG. 22 is a perspective view illustrating the film-dismounting mechanism of FIG. 19.

A film-dismounting mechanism 166 might be a belt-type, as shown in FIG. 22, other than the one using an arm described above. In this type, a belt 180 is attached to a jig 51 which slidably supports a film-dismounting plate 20, and it is driven by a driving motor 181 for dismounting.

Next, the operation and action procedure of the film-rewinding apparatus, FIG. 19, will be described. The operator first sets the cartridge 1 and the intermediate magazine 151 to the holders 152 and 153, respectively, and attaches the holders 152 and 153 to the body. Then, the operator turns on the switches of the driving motors 158 and 159 to send the cartridge 1 and the intermediate magazine 151 to the set position where they can be handled. Then, the control of each motor can be done automatically. Namely, the slide motor 168, FIG. 20, makes the unit frame 65 slide to insert the shielding door driving axis 40 and the spool-driving axis 46 into the shielding door operating shaft 6 of the cartridge and into the spool 2, respectively. The spool-driving motor 158 is rotated slowly to fit the key of the spool-driving axis 46 to the key groove 13 of the spool 2. When the key is fitted into the key groove, the spool-driving axis 46 advances a little, which is detected by a photosensor 70, and the spool-driving motor 158 is stopped.

Then, the shielding door driving motor is driven to open the shielding door 5, and the spool-driving motor is driven to feed out the film 16 from the cartridge 1 to the transfer channel 160. The perforation-detecting sensor 164 provided in the transfer channel 160 detects the tip of the film, and the spool 2 is stopped after driving the spool-driving motor in a predetermined amount.

Next, the slide motor 176 is driven to slide the slide rack 173 to the intermediate magazine 151 side. The jig 172 is operated by the opening/closing driving motor 170 to open the opening 163. Afterwards, the spool-driving motor is driven to lead the tip of the film 16, which has advanced to the film transfer channel 160, into the intermediate magazine 151 to be accommodated therein.

After the film 16 is fed out and the perforation-detecting sensor 164 detects the rear end of the film 16, the spool-driving motor is stopped Then, the film-dismounting motor 181 is driven to insert the film-dismounting plate 20 into the cartridge 1. Simultaneously with pulling out the film-dismounting plate 20, the film transfer roller 161 is rotated, then the film 16 can be easily pulled out from the cartridge 1, and the engaging state of the spool 2 and the film 16 are released.

Then, the opening and closing driving motor 170 is driven to close the opening 163 of the intermediate magazine 151, and the slide rack 173 is slided to the cartridge 1 side by a slide motor 176. Thereafter, the shielding door is closed by the shielding door driving motor, and the shielding door driving axis 40 and the spool-driving axis 46 are pulled out from the cartridge 1 by the slide motor 168 to complete the process for one cycle. Then, respective holders 152 and 153 are rotated to perform the similar operation. After the films 16 of all the cartridges 1 are rewound to the intermediate magazines 151, respective holders 152 and 153 are dismounted from the body and the cartridges 1 and the intermediate magazines 151 are picked out.

As described above, the film-rewinding apparatus of the present invention can easily perform rewinding only by operating a handle or a lever, or by switching operation, after the cartridge and the intermediate magazine are set and the cover is locked. It greatly improves the working efficiency. Furthermore, in the case where the intermediate magazine has a shaft and rewinding is performed by driving the shaft, the film can be tightly wound, thereby, the capacity of the magazine can be made small to make the apparatus small.

Though several embodiments of the present invention are described above, it is to be understood that the present invention is not limited only to the above-mentioned and various changes and modifications might be made in the invention without departing from the spirit and scope thereof.

What is claimed is:

1. A film-rewinding apparatus for receiving and rewinding film from a cartridge having a rotatable spool in an outer case, said spool having a pawl on a shaft for engaging and winding film on said spool, said outer case having a film port and rotatably supporting said spool, a shielding door on said film port, and an intermediate magazine for receiving and storing therein the film withdrawn from said cartridge, said film being received through an opening in said intermediate magazine, the apparatus comprising:

- a cartridge-support for supporting said cartridge,
- a shielding door operating shaft for opening and closing said shielding door on said cartridge,
- a spool driving mechanism for opening said shielding door on said cartridge and for feeding film out of said cartridge by driving said spool,
- a film driving mechanism for receiving film fed out of said cartridge and for driving said film so that the film is received by said opening in said intermediate magazine for receiving film from said cartridge film to be stored,
- an opening and closing lid mounted on said intermediate magazine and pivotally connected to said intermediate magazine and forming, at one end of said lid when said lid is open, with said intermediate magazine, an opening for receiving film from said cartridge into said intermediate magazine when said film is fed from said cartridge and for discharging film from said intermediate magazine when said lid is open and said film is to be discharged,
- a handle mounted on said end of said lid adjacent said opening and projecting outwardly from said lid for opening and closing said lid,
- a lid opening arm pivotally mounted on said apparatus and adjacent a side of said lid intermediate said one end and an opposite end of said lid and above said pivotal connection of said lid to said intermediate magazine, said lid opening arm sloping upward and away from said lid above said pivotal connection of said lid to said intermediate magazine at one end of said lid opening arm and extending under said handle at an opposite end of said lid opening arm,
- a lock lever slidably mounted to said apparatus and extending vertically upward from said lid opening arm and having a roller at a vertical bottom of said lock lever, said lid opening arm and said lock lever being structured such that said roller engages said lid opening arm adjacent said handle end of said lid to close said opening in said intermediate magazine and prevent light from entering said intermediate magazine when said lock lever is moved to said handle end of said lid and said roller engages said upward sloping end to open said opening for receiving said film from said cartridge when said lock lever is moved to said upward sloping end of said lid opening arm, a film-dismounting mechanism having a thin elastic dismounting plate for dismounting said film from said spool by inserting said thin elastic film dismounting plate between said pawl of said spool and said film in said cartridge for transferring film from said cartridge to said intermediate magazine, and an intermediate magazine holder having a plurality of intermediate magazine-supporting portions and a moving means for moving an intermediate magazine supported by said magazine holder from a pass-by position to a set position for operation with the apparatus.

2. A film-rewinding apparatus for receiving and rewinding film from a cartridge having a rotatable spool in an outer case, said spool having a pawl on a shaft for engaging and winding film on said spool, said outer case having a film port and rotatably supporting said spool, a shielding door on said film port, and an intermediate magazine for receiving and storing therein the film withdrawn from said cartridge, said film being received through an opening in said intermediate magazine, the apparatus comprising:

a cartridge-support for supporting said cartridge, a shielding door operating shaft for opening and closing said shielding door on said cartridge, a spool driving mechanism for opening said shielding door on said cartridge and for feeding film out of said cartridge by driving said spool, a film driving mechanism for receiving film fed out of said cartridge and for driving said film so that the film is received by said opening in said intermediate magazine for receiving film from said cartridge film to be stored, an opening and closing lid mounted on said intermediate magazine and pivotally connected to said intermediate magazine and forming, at one end of said lid when said lid is open, with said intermediate magazine, an opening for receiving film from said cartridge into said intermediate magazine when said film is fed from said cartridge and for discharging film from said intermediate magazine when said lid is open and said film is to be discharged, a handle mounted on said end of said lid adjacent said opening and projecting outwardly from said lid for opening and closing said lid, a lid opening arm pivotally mounted on said apparatus and adjacent a side of said lid intermediate said one end and an opposite end of said lid and above said pivotal connection of said lid to said intermediate magazine, said lid opening arm sloping upward and away from said lid above said pivotal connection of said lid to said intermediate magazine at one end of said lid opening arm and extending under said handle at an opposite end of said lid opening arm, a lock lever slidably mounted to said apparatus and extending vertically upward from said lid opening arm and having a roller at a vertical bottom of said lock lever, said lid opening arm and said lock lever being structured such that said roller engages said lid opening arm adjacent said handle end of said lid to close said opening in said intermediate magazine and prevent light from entering said intermediate magazine when said lock lever is moved to said handle end of said lid and said roller engages said upward sloping end to open said opening for receiving said film from said cartridge when said lock lever is moved to said upward sloping end of said lid opening arm, a film-dismounting mechanism having a thin elastic dismounting plate for dismounting said film from said spool by inserting said thin elastic film dismounting plate between said pawl of said spool and said film in said cartridge for transferring film from said cartridge to said intermediate magazine, said film being engaged to said shaft, a film winding mechanism for driving said shaft; and an intermediate magazine holder having a plurality of intermediate magazine-supporting portions and a moving means for moving an intermediate magazine supported by said magazine holder from a pass-by position to a set position for operation with the apparatus.

3. A film-rewinding apparatus for receiving and rewinding film from a cartridge having a rotatable spool in an outer case, said spool having a pawl on a shaft for engaging and winding film on said spool, said outer case having a film port and rotatably supporting said spool, a shielding door on said film port, and an intermediate magazine for receiving and storing therein the film withdrawn from said cartridge, said film being received through an opening in said intermediate magazine, the apparatus comprising:

a cartridge-support for supporting said cartridge, a shielding door operating shaft for opening and closing said shielding door on said cartridge, a spool driving mechanism for opening said shielding door on said cartridge and for feeding film out of said cartridge by driving said spool, a film driving mechanism for receiving film fed out of said cartridge and for driving said film so that the film is received by said opening in said intermediate magazine for receiving film from said cartridge film to be stored, an opening and closing lid mounted on said intermediate magazine and pivotally connected to said intermediate magazine and forming, at one end of said lid when said lid is open, with said intermediate magazine, an opening for receiving film from said cartridge into said intermediate magazine when said film is fed from said cartridge and for discharging film from said intermediate magazine when said lid is open and said film is to be discharged, a handle mounted on said end of said lid adjacent said opening and projecting outwardly from said lid for opening and closing said lid, a lid opening arm pivotally mounted on said apparatus and adjacent a side of said lid intermediate said one end and an opposite end of said lid and above said pivotal connection of said lid to said intermediate magazine, said lid opening arm sloping upward and away from said lid above said pivotal connection of said lid to said intermediate magazine at one end of said lid opening arm and extending under said handle at an opposite end of said lid opening arm, a lock lever slidably mounted to said apparatus and extending vertically upward from said lid opening arm and having a roller at a vertical bottom of said lock lever, said lid opening arm and said lock lever being structured such that said roller engages said lid opening arm adjacent said handle end of said lid to close said opening in said intermediate magazine and prevent light from entering said intermediate magazine when said lock lever is moved to said handle end of said lid and said roller engages said upward sloping end to open said opening for receiving said film from said cartridge when said lock lever is moved to said upward sloping end of said lid opening arm, a film-dismounting mechanism having a thin elastic dismounting plate for dismounting said film from said spool by inserting said thin elastic film dismounting plate between said pawl of said spool and said film in said cartridge for transferring film from said cartridge to said intermediate magazine;

a guide plate for guiding the film provided on the shaft of said cartridge; and an intermediate magazine holder having a plurality of intermediate magazine-supporting portions and a moving means for moving an intermediate magazine supported by the magazine holder from a pass-by position to a set position for operation with the apparatus.

4. A film-rewinding apparatus for receiving and rewinding film from a cartridge having a rotatable spool in an outer case, said spool having a pawl on a shaft for engaging and winding film on said spool, said outer case having a film port and rotatably supporting said spool, a shielding door on said film port, and an intermediate magazine for receiving and storing therein the film withdrawn from said cartridge, said film being received through an opening in said intermediate magazine, the apparatus comprising:

a cartridge-support for supporting said cartridge, a shielding door operating shaft for opening and closing said shielding door on said cartridge, a spool driving mechanism for opening said shielding door on said cartridge and for feeding film out of said cartridge by driving said spool, a film driving mechanism for receiving film fed out of said cartridge and for driving said film so that the film is received by said opening in said intermediate magazine for receiving film from said cartridge film to be stored, an opening and closing lid mounted on said intermediate magazine and pivotally connected to said intermediate magazine and forming, at one end of said lid when said lid is open, with said intermediate magazine, an opening for receiving film from said cartridge into said intermediate magazine when said film is fed from said cartridge and for discharging film from said intermediate magazine when said lid is open and said film is to be discharged, a handle mounted on said end of said lid adjacent said opening and projecting outwardly from said lid for opening and closing said lid, a lid opening arm pivotally mounted on said apparatus and adjacent a side of said lid intermediate said one end and an opposite end of said lid and above said pivotal connection of said lid to said intermediate magazine, said lid opening arm sloping upward and away from said lid above said pivotal connection of said lid to said intermediate magazine at one end of said lid opening arm and extending under said handle at an opposite end of said lid opening arm, a lock lever slidably mounted to said apparatus and extending vertically upward from said lid opening arm and having a roller at a vertical bottom of said lock lever, said lid opening arm and said lock lever being structured such that said roller engages said lid opening arm adjacent said handle end of said lid to close said opening in said intermediate magazine and prevent light from entering said intermediate magazine when said lock lever is moved to said handle end of said lid and said roller engages said upward sloping end to open said opening for receiving said film from said cartridge when said lock lever is moved to said upward sloping end of said lid opening arm, a film-dismounting mechanism having a thin elastic dismounting plate for dismounting said film from said spool by inserting said thin elastic film dismounting plate between said pawl of said spool and said film in said cartridge for transferring film from said cartridge to said intermediate magazine, said cartridge having a shaft to which said film is engaged and a film-rewinding mechanism for driving said shaft;

a guide plate for guiding the film provided on the shaft of said cartridge; and an intermediate magazine holder having a plurality of intermediate magazine-supporting portions and a moving means for moving an intermediate magazine supported by the magazine holder from a pass-by position to a set position for operation with the apparatus.

* * * * *